(12) United States Patent
Hsu et al.

(10) Patent No.: US 11,150,438 B2
(45) Date of Patent: Oct. 19, 2021

(54) PROTECTED INTERCONNECT FOR SOLID STATE CAMERA MODULE

(71) Applicant: Apple Inc., Cupertino, CA (US)

(72) Inventors: Ya Wen Hsu, San Francisco, CA (US); Pierre-Jean Y. Parodi-Keravec, San Francisco, CA (US); Steven Webster, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 16/324,260

(22) PCT Filed: Aug. 9, 2017

(86) PCT No.: PCT/US2017/046131
§ 371 (c)(1),
(2) Date: Feb. 8, 2019

(87) PCT Pub. No.: WO2018/031677
PCT Pub. Date: Feb. 15, 2018

(65) Prior Publication Data
US 2019/0179107 A1 Jun. 13, 2019

Related U.S. Application Data

(60) Provisional application No. 62/373,285, filed on Aug. 10, 2016.

(51) Int. Cl.
*G02B 7/02* (2021.01)
*G02B 7/09* (2021.01)
(Continued)

(52) U.S. Cl.
CPC ............... *G02B 7/09* (2013.01); *G02B 7/04* (2013.01); *H04N 5/2253* (2013.01); *H04N 5/2254* (2013.01); *H04N 5/2257* (2013.01)

(58) Field of Classification Search
CPC .......... G02B 7/09; G02B 7/04; H04N 5/2253; H04N 5/2254; H04N 5/2257
(Continued)

(56) References Cited

U.S. PATENT DOCUMENTS 4,054,890 A 10/1977 Shimomura
7,585,122 B2 9/2009 Erom ki
(Continued)

FOREIGN PATENT DOCUMENTS

EP 0257675 3/1988
EP 3133440 2/2017
(Continued)

*Primary Examiner* — William Choi
(74) *Attorney, Agent, or Firm* — Robert C. Kowert; Kowert, Hood, Munyon, Rankin & Goetzel, P.C.

(57) ABSTRACT

A camera module includes a solid state lens that flexes, in response to electrical signals. A lens barrel holds the lens on the optical axis. A lens barrel holder holds the lens barrel above an image sensor. The lens barrel holder includes electrically conductive interconnects between a bottom and a top end of the lens barrel holder. The conductive interconnects are not exposed to an exterior of the lens barrel holder. The camera module includes two or more respective lower electrically conductive connections in proximity to the interconnects and connecting the electrically conductive interconnects to respective conductors for the one or more electrical signals. The camera module includes two or more upper conductive connections configured to electrically connect the solid state lens to respective ones of the two or more conductive interconnects.

20 Claims, 13 Drawing Sheets

(51) Int. Cl.
*H04N 5/225* (2006.01)
*G02B 7/04* (2021.01)

(58) Field of Classification Search
USPC .................................................. 359/676, 823
See application file for complete search history.

(56) References Cited

U.S. PATENT DOCUMENTS

| | | | |
|---|---|---|---|
| 8,411,193 | B2 | 4/2013 | Chiu |
| 9,703,173 | B2 | 7/2017 | Brodie et al. |
| 2008/0037143 | A1 | 2/2008 | Yoon |
| 2009/0161239 | A1 | 6/2009 | Verhaar et al. |
| 2009/0213232 | A1 | 8/2009 | Asakura et al. |
| 2010/0134866 | A1 | 6/2010 | Foller et al. |
| 2011/0304762 | A1 | 12/2011 | Chiu |
| 2012/0092543 | A1 | 4/2012 | Afshari et al. |
| 2012/0120298 | A1 | 5/2012 | Chiu et al. |
| 2012/0140101 | A1 | 6/2012 | Afshari et al. |
| 2013/0016188 | A1 | 1/2013 | Ogasahara |
| 2013/0057757 | A1 | 3/2013 | Ryou |
| 2013/0215489 | A1 | 8/2013 | Blackburn et al. |
| 2013/0271648 | A1 | 10/2013 | Brodie et al. |
| 2013/0329126 | A1 | 12/2013 | Brodie et al. |
| 2014/0028905 | A1 | 1/2014 | Kim |
| 2014/0043519 | A1 | 2/2014 | Azuma et al. |
| 2014/0050469 | A1 | 2/2014 | Song |
| 2016/0088198 | A1 | 3/2016 | An et al. |
| 2016/0313628 | A1 | 10/2016 | Brodie et al. |

FOREIGN PATENT DOCUMENTS

| | | |
|---|---|---|
| KR | 101262878 | 5/2013 |
| KR | 20130136766 | 12/2013 |
| KR | 1020140007183 | 1/2014 |
| WO | 0049455 | 8/2000 |
| WO | 2013133584 | 9/2013 |
| WO | 2013191359 | 12/2013 |
| WO | 2014106276 | 7/2014 |
| WO | 2015160155 | 10/2015 |

PROTECTED INTERCONNECT FOR SOLID STATE CAMERA MODULE

This application is a 371 of PCT Application No. PCT/US2017/046131, filed Aug. 9, 2017, which claims benefit of priority to U.S. Provisional Patent Application No. 62/373,285, filed Aug. 10, 2016. The above applications are incorporated herein by reference. To the extent that any material in the incorporated application conflicts with material expressly set forth herein, the material expressly set forth herein controls.

BACKGROUND

Portable electronic devices, such as mobile phones, typically include a miniaturized camera module that utilizes an image sensor to capture images. Conventional camera modules may include various combinations of magnets or motors to physically move the position of a lens, thereby adjusting the object focal distance of the lens to allow objects at different distances to be in sharp focus at the image plane of an image sensor. Consequently, conventional camera modules may be susceptible to mechanical failures and/or may require a large amount of physical space.

Demands on improvements to performance of such miniature cameras are constant, as are demands for continued miniaturization, given the added features and applications added to such mobile devices. For example, highly miniaturized cameras in mobile devices do not typically have enough physical space available for physically movable or extendable camera modules. Furthermore, as the size of camera modules shrinks, the space available for electrical connections between various camera components also decreases.

Moreover, the complexity of the routing and design of electrical connections within a given camera module therefore increases as the physical footprint of the camera module decreases. As the complexity of the electrical connections rises, so too does the risk of incurring damage to the electrical interconnects during use of the camera module. For example, tiny wires may be susceptible to being disconnected or severed due to scratches, vibrations, or other physical damage caused during use in real world environments.

SUMMARY

A camera module and method of manufacturing a camera module are disclosed. In one embodiment, a camera module may include a solid state lens configured to flex, in response to one or more electrical signals. The camera module may include a lens barrel configured to hold the solid state lens on the optical axis. The camera module may include an image sensor below the lens barrel. The camera module may include a lens barrel holder configured to hold the lens barrel above the image sensor. In some embodiments, the lens barrel holder may include two or more electrically conductive interconnects configured to transmit the one or more electrical signals between a bottom end of the lens barrel holder and a top end of the lens barrel holder in proximity to the solid state lens. In an embodiment, the conductive interconnect is not exposed to an exterior of the lens barrel holder. The camera module may include respective ones of two or more lower electrically conductive connections in proximity to respective ones of the conductive interconnects and connecting the electrically conductive interconnects to respective conductors for the one or more electrical signals. The camera module may include two or more upper electrically conductive connections configured to electrically connect the solid state lens to respective ones of the two or more conductive interconnects.

In one embodiment, the two or more conductive interconnects may include electrically conductive material on an inside surface of the lens barrel holder. In an embodiment, the two or more conductive interconnects may include electrically conductive material inside a wall of the lens barrel holder, such that the two or more conductive interconnects are not exposed to an inner surface or an outer surface of the lens barrel holder. In one embodiment, the two or more upper electrically conductive connections and the two or more lower electrically conductive connections may include electrically conductive material in holes, cavities, or depressions in the lens barrel holder and/or the lens barrel. In some embodiments, the lower conductive connections and the upper conductive connections may include electrically conductive solder. In various embodiments, the lower conductive connections and the upper conductive connections may include electrically conductive adhesive. In one embodiment, the camera module may include a protective ring positioned around an outer edge of the solid state lens, and the protective ring may be part of (e.g., an extension of) the lens barrel or part of the lens barrel holder.

In an embodiment, a multifunction device may include a central processing unit and a system memory connected to the central processing unit. In one embodiment, the multifunction device may include a camera module connected to the central processing unit. In one embodiment, the camera module of the multifunction device may include a solid state lens configured to flex, in response to one or more electrical signals. The camera module may include a lens barrel configured to hold the solid state lens on the optical axis. The camera module may include an image sensor below the lens barrel. The camera module may include a lens barrel holder configured to hold the lens barrel above the image sensor. In some embodiments, the lens barrel holder may include two or more electrically conductive interconnects configured to transmit the one or more electrical signals between a bottom end of the lens barrel holder and a top end of the lens barrel holder in proximity to the solid state lens. In an embodiment, the conductive interconnect is not exposed to an exterior of the lens barrel holder. The camera module may include respective ones of two or more lower electrically conductive connections in proximity to respective ones of the conductive interconnects and connecting the electrically conductive interconnects to respective conductors for the one or more electrical signals. The camera module may include two or more upper electrically conductive connections configured to electrically connect the solid state lens to respective ones of the two or more conductive interconnects. In one embodiment, the camera module may include a substrate below the lens barrel, and the substrate may include a hole in the center of the substrate along the optical axis, such that an image sensor with a flip chip mount may be configured to attach to an underside of the substrate.

In an embodiment, a method of manufacturing a camera module may include forming a lens barrel configured to hold a solid state lens on an optical axis of the camera module. The method may include forming a lens barrel holder configured to hold the lens barrel above an image sensor. The method may include forming, in the lens barrel holder, two or more electrically conductive interconnects configured to transmit one or more electrical signals between a bottom end of the lens barrel holder and a top end of the lens barrel holder. In some embodiments, the conductive interconnect is not exposed to an exterior of the lens barrel holder. The method may include positioning respective ones of two or more lower electrically conductive connections in proximity to respective ones of the two or more conductive interconnects. The method may also include positioning respective ones of two or more upper electrically conductive connections configured to electrically connect the solid state lens to respective ones of the two or more conductive interconnects. The method may include positioning, at a top end of the lens barrel, the solid state lens.

In some embodiments, forming the two or more conductive interconnects in the lens barrel holder may include adding electrically conductive material to the lens barrel holder with a laser direct structuring (LDS) process. In various embodiments, forming the two or more conductive interconnects in the lens barrel holder may include mechanically inserting electrically conductive material into two or more respective holes in the lens barrel holder. In an embodiment, forming the lens barrel holder may include inserting the two or more conductive interconnects into a mold of the lens barrel holder and injecting plastic into the mold around the two or more conductive interconnects.

Figure 1:
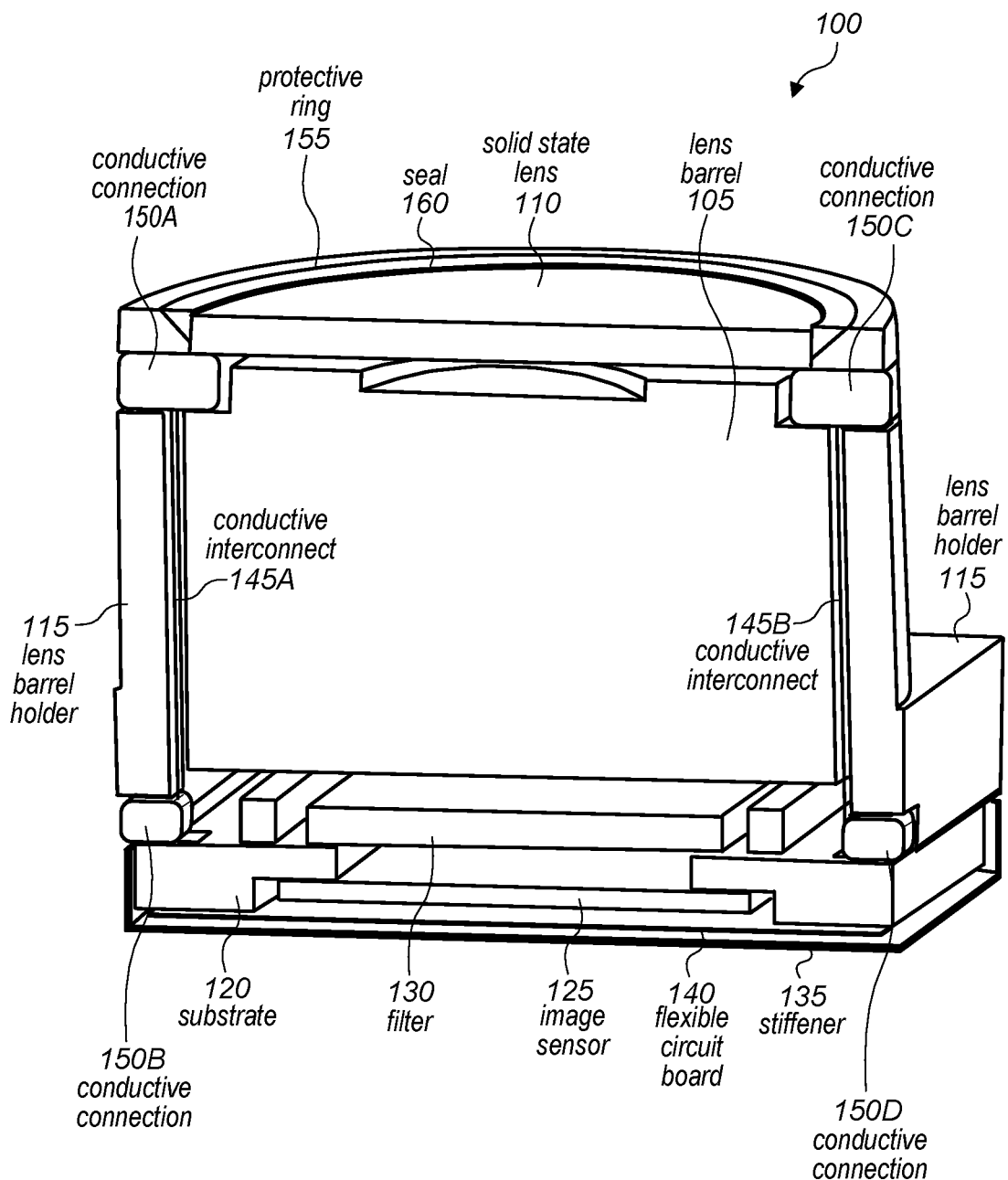
FIG. 1 is a logical block diagram illustrating an example camera module, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof. It will also be understood that the term "and/or" as used herein refers to and encompasses any and all possible combinations of one or more of the associated listed items.

DETAILED DESCRIPTION

A camera module or other image processing device may implement many different techniques or components to focus light captured by an image sensor. In one embodiment, a camera module may include a solid state lens configured to change shape in response to one or more electrical signals (e.g., voltage and/or current from a controller electrically connected to the solid state lens), thereby changing a focus (e.g., an optical focus) and/or one or more characteristics of an image received by the camera module. In an embodiment, the solid state lens may flex relative to an optical axis (e.g., along the optical axis and/or in other directions) in response to one or more electrical signals. The solid state lens may thereby provide an autofocus function for the camera module based on control signals received from a processor configured to adjust the flexing and/or shape of the lens based on the light corresponding to an image in the field of view of the lens and image sensor. In an embodiment, the camera module may include electrical interconnects between the solid state lens and a substrate, where the substrate is in turn connected to one or more controllers (e.g., processors) via a circuit board (e.g., a flexible circuit board). Since the solid state lens does not require mechanical lens components like auto-focus actuators moving the lens with regard to the image sensor (e.g., a VCM (Voice Coil Motor) and/or Piezo-electric systems), the camera module may occupy a relatively smaller amount of space in the Z-direction (i.e., a reduced Z-axis profile). In some embodiments, the camera module may not include a substrate, and the image sensor may be mounted to the bottom of the lens barrel.

In various embodiments, the electrically conductive interconnects between the solid state lens and the camera module substrate may be at least partially protected (i.e., guarded or shielded) from physical damage. For example, the electrical interconnects may be along an inside surface of the camera module and/or embedded within a wall of the camera module, thereby providing a robust and secure connection between the lens and the substrate while protecting the electrical interconnects from the external surfaces of the camera module. In other words, the electrical interconnects may be routed and installed in such a way as to shield the electrical interconnects from the outside world, thereby minimizing the chances of damage due to scratches or other physical harm caused by any external objects that may make contact with the camera module during use. The design of the electrical interconnects thus improves the reliability of the camera module by protecting the electrical interconnects.

In some embodiments, a camera module may include a lens barrel configured to hold (i.e., support or be attached to) a solid state lens and other optical elements, such as a lens stack. The lens barrel may include an optically transparent center, such as a transparent material, a cavity, or an opening, in the middle of the lens barrel that allows light to pass from the lens through the lens barrel to an image sensor located on the substrate below the lens barrel. In other embodiments, the image sensor may be located on the bottom of the lens barrel and a substrate may not be included in the camera module. In an embodiment, the lens barrel may be configured to fit inside a lens barrel holder, which may be one of the externally facing components of the camera module. In other words, the lens may sit on top of the lens barrel, which is configured to fit inside the lens barrel holder. The lens barrel holder thus supports the lens barrel such that the lens barrel is positioned above an image sensor. In various embodiments, the solid state lens, the lens barrel, and the lens barrel holder may be various shapes. For example, the lens, lens barrel, and lens holder may be circular, square, rectangular, hexagonal, octagonal, oval-shaped, or other types of shapes.

In one embodiment, the lens barrel may include an extension around its upper rim (e.g., a protective ring) configured to fit around the edge of the outer circumference of the solid state lens without obstructing the optical face or axis of the solid state lens. The lens barrel extension may thus physically protect the solid state lens by guarding the edge of the lens from scratches or pressure due to contact with external objects. In other embodiments, the protective extension or ring may instead be an extension of the lens barrel holder.

Figure 10:
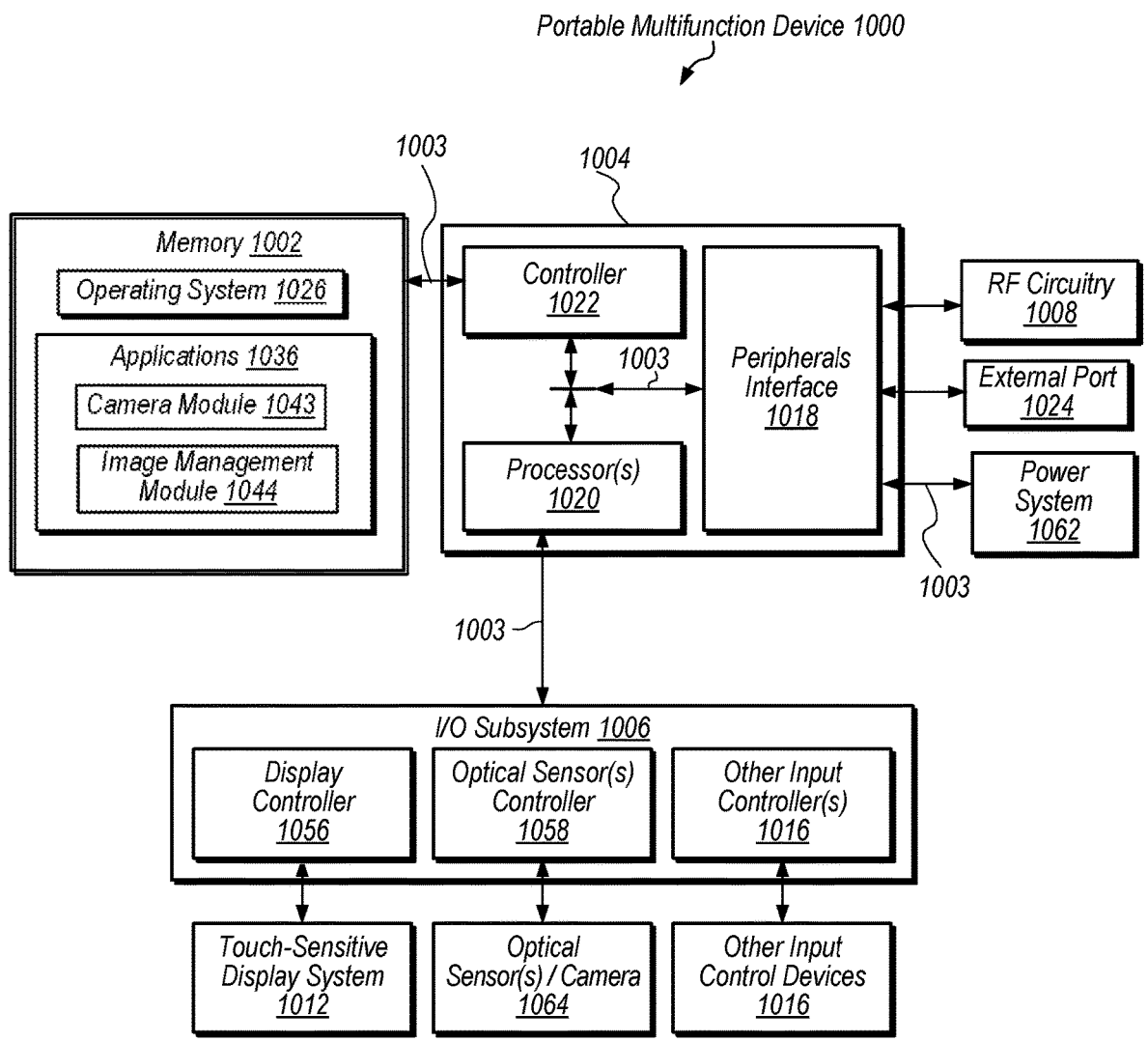
FIG. 10 is a logical block diagram illustrating an example portable multifunction device with a camera module, according to some embodiments.
Figure 11:
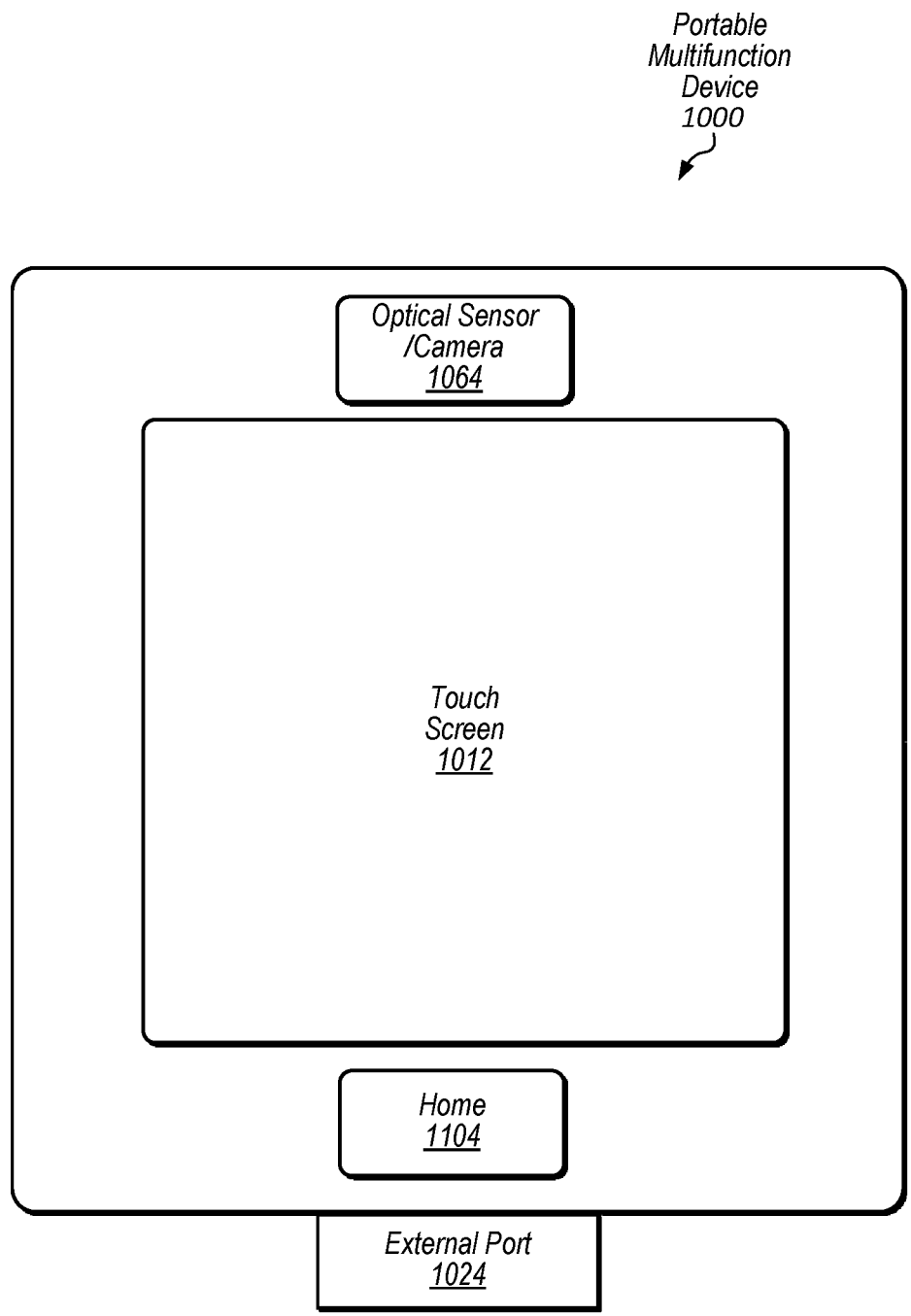
FIG. 11 is a logical block diagram illustrating an example portable multifunction device having a camera module, according to some embodiments.
Figure 12:
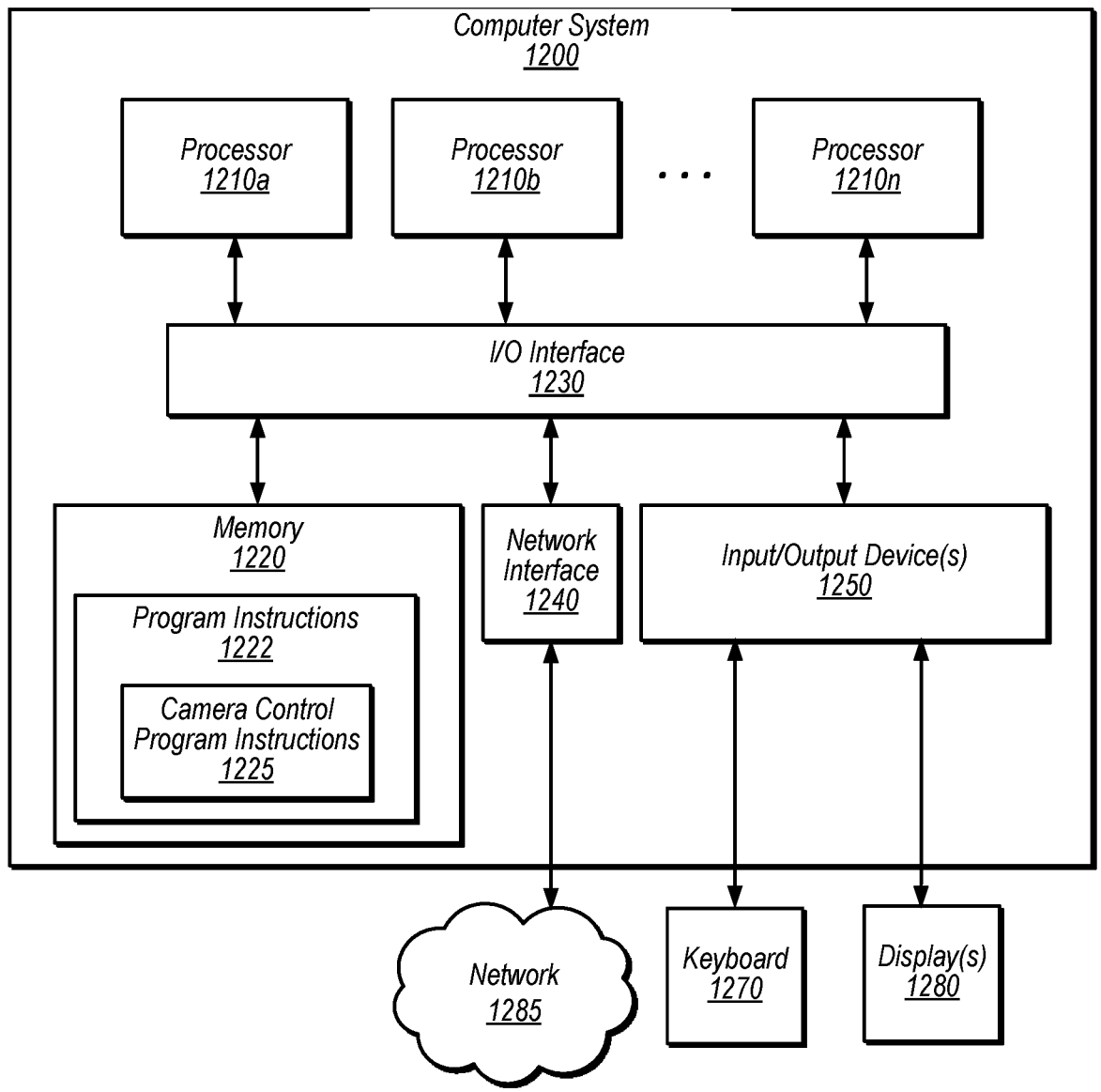
FIG. 12 is a logical block diagram illustrating an example computer system, according to some embodiments.

In an embodiment, the substrate may have a hole or cavity in the center configured to provide space for the image sensor to be attached to the bottom of the substrate via a flip chip mount. In an embodiment, the substrate may be attached to a flexible circuit board, which may include multiple electrical connections configured to conduct electrical signals (e.g., control signals, data signals, and electrical power) to the substrate from processors and/or other components of a multifunction device that includes the camera module. In other embodiments, the electrically conductive interconnects included in the lens barrel holder may be connected directly to respective conductors for the one or more electrical signals. In various embodiments, the respective conductors may connect the electrically conductive interconnects to the substrate, the flexible circuit board, other modules inside the base of the camera module, and/or other electrically conductive lower contact areas in proximity to the base of the camera module. In some embodiments, a substrate may not be included in the camera module, and the respective conductors may instead be located on the flexible circuit board and/or on other electrical components connected to the lower area of the camera module. Examples of multifunction devices are illustrated in FIGS. 10, 11, and 12, which are discussed below. In some embodiments, a stiffener (e.g., a metal, ceramic, or plastic component) may be attached to the bottom of the flexible circuit board, thereby forming a rigid protective base for the camera module. In an embodiment, the stiffener may also include one or more electrical ground connections. Examples of the various components of a camera module are illustrated in FIGS. 1-9, which are discussed in detail below.

In some embodiments, the lens barrel holder may be composed of a plastic or polymer material. For example, the plastic lens barrel holder may be manufactured using a material suitable for laser direct structuring (LDS). In a LDS embodiment, multiple electrical interconnects (i.e., LDS traces) may be formed in channels on an inner surface of the lens barrel holder via the use of a laser and an electrically conductive material deposition, such that the path of the electrical interconnects are at least partially integrated in the inner surface of the lens barrel holder. In other embodiments, the electrical interconnects may include electrically conductive material (e.g., metal) embedded within the wall of the lens barrel holder (i.e., inside the plastic and not exposed to either the interior or exterior surfaces of the plastic wall) during the plastic molding process. The electrical interconnects may thus not be exposed to an exterior of the lens barrel holder. In another embodiment, the electrical interconnects may be physically inserted (e.g., via a manual or automated process) into the plastic lens barrel holder after the plastic molding process. In yet another embodiment, the electrical interconnects may be deposited or filled (e.g., via a metal deposition process or an electrically conductive material filling process) into holes or cavities left in the wall(s) of the plastic lens barrel holder after the plastic molding process.

In one embodiment, the top and bottom of the lens barrel and/or the lens barrel holder may include multiple respective upper and lower contact areas, holes, pockets, cavities, gaps, spaces, and/or depressions located in positions corresponding to the top and bottom ends of respective ones of the electrical interconnects. The upper and lower contact areas may be configured to allow room for respective upper and lower conductive connections that may include electrically conductive adhesive, electrically conductive epoxy, electrically conductive glue, and/or electrically conductive low-temperature solder to be added during the camera module assembly process. The electrically conductive adhesive or solder placed in the upper contact areas of the lens barrel may thus make electrically conductive contact between the solid state lens and the top ends of the interconnects, while the electrically conductive adhesive or solder placed in the lower contact areas of the lens barrel may make electrically conductive contact between the lower ends of the electrical interconnects and respective electrical conductors (e.g., bonding pads) on the substrate and/or the flexible circuit board, thereby allowing electrical signals to flow back and forth along respective paths from the flexible circuit board to the substrate, along the electrical interconnects, and to the solid state lens. The electrically conductive adhesive or solder may also provide the benefit of attaching the solid state lens securely to the camera module. The solid state lens thus enable a camera module to selectively provide autofocus without the need for bulky actuator motors that move optical components in a lens barrel.

The techniques described herein for implementing a camera module having a solid state lens and a protected integrated electrical interconnect between the solid state lens and the substrate of the camera module may be further illustrated in terms of an example system that employs them, as well as in terms of example method of manufacturing them. As noted herein, these techniques may be implemented in any type of camera, apparatus, or computing system that includes the capability to capture and process image data, including video clips.

In an embodiment, a stream of raw pixel data collected from an image sensor may be received at an image signal processor (ISP). Raw pixel data may be captured and processed in stream fashion as it is collected at an image sensor. In one embodiment, raw image pixel data, as discussed above, may be formatted such that multiple color components or channels are not included for an individual pixel. An example of raw image data is a Bayer image format (of which there may be many variations) that includes different rows of pixel values for collecting light in different colors, green, red, and blue, which depend on the configuration of the image sensor. These pixel values (e.g., green values, red values, or blue values) may be collected and provided in raster order to the image signal processor, in some embodiments. In various embodiments, one or more image sensor(s) may be included in a camera module, and the image sensor(s) may be complementary metal-oxide-semiconductor (CMOS) image sensor(s), charge coupled device (CCD) image sensor(s), photodiode(s), and/or another types of image sensor(s).

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

FIG. 1 is a logical block diagram illustrating an example camera module 100, according to some embodiments. As illustrated in this example, camera module 100 may include a lens barrel 105 having an optical path parallel to an optical axis along the center of lens barrel 105. In various embodiments, lens barrel 105 may have an opening in the center along the optical path, be hollow in the center, and/or be composed of an optically transparent material along the optical path. In some embodiments, lens barrel 105 may include one or more additional optical elements, such as a lens stack. In an embodiment, camera module 100 may include a solid state lens 110 positioned above lens barrel 105 along the optical axis of camera module 100, where the solid state lens 105 is configured to receive light from one or more objects in a field of view of camera module 100. In an embodiment, a filter 130 may be positioned below lens barrel 105 and above an image sensor 125 along the optical axis. Filter 130 may be configured to selectively filter various wavelengths (i.e., colors) of light as the light passes from solid state lens 110 through lens barrel 105, through filter 130, and ultimately to image sensor 125. For example, filter 130 may be a Bayer color filter or another type of color filter. In one embodiment, solid state lens 105 may be configured to selectively flex and/or change shape in response to one or more electrical signals received from a control module (e.g., processor(s) 1020 of FIG. 10) to change a focus of camera module 100 and/or adjust various attributes of an image received by the camera module 100. Solid state lens 105 may thus be mounted to camera module 100 in a fixed position (i.e., without magnets, springs, or other motorized actuator components) using electrically conductive adhesive or solder, while still being able to dynamically focus light by flexing. Processor(s) 1020 and solid state lens 105 may thus provide a dynamic focusing or automatic focusing function for images in the field of view of camera module 100 using components that remain affixed (e.g., glued or bonded) together.

In one embodiment, lens barrel 105 may be positioned inside a lens barrel holder 115. Lens barrel holder 115 may be configured to support lens barrel 105 and hold lens barrel 105 above (e.g., without touching) filter 130 and image sensor 125. In some embodiments, one or more portions of lens barrel holder 115, such as the lateral sides and/or base, may be externally-facing and formed of a material (e.g., plastic or a polymer) that provides physical protection to lens barrel 105 and internal components of camera module 100.

In an embodiment, lens barrel holder 115 may be composed of a plastic or polymer material. In one embodiment, multiple electrically conductive interconnects 145A-B may be formed on (or at least partially integrated into) respective inner surfaces of lens barrel holder 115, thereby protecting conductive interconnects 145A-B from damage. For example, electrically conductive interconnects 145A-B may be formed by a LDS process, where a laser traces the desired location (e.g., channels) of the interconnect electrical traces along the wall of lens barrel holder 115 and a subsequent electrically conductive material deposition step (e.g., metal deposition) causes the electrically conductive material to adhere to the traced channels on the inner surface of the wall of lens barrel holder 115. In some embodiments, the LDS process may also be configured to form portions of electrically conductive interconnects 145A-B on respective areas of the top and bottom surfaces of lens barrel holder 115, thereby producing top and bottom portions of conductive interconnects 145A-B that may be aligned and substantially parallel to electrical contact points on solid state lens 110 and substrate 120, respectively. In other words, the top and bottom ends of electrically conductive interconnects 145A-B may at least partially wrap around, overlap, and/or extend from the upper and lower edges of lens barrel holder 115. In some embodiments, the overlapping and/or extending portions of conductive interconnects 145A-B may not be exposed to an exterior of lens barrel holder 115 or camera module 100. Similarly, in various embodiments one or more of upper and/or lower conductive connections 150A-D may not be exposed to the exterior of lens barrel holder 115 or camera module 100. Although FIG. 1 depicts two conductive interconnects 145A-B, in other embodiments more than two conductive interconnects may be included in camera module 100 to transmit various types of control signals, provide electrical power, and/or provide electrical grounding between solid state lens 110 and substrate 120, which is in turn connected to flexible circuit board 140. In some embodiments, camera module 100 may not include substrate 120 and the conductive interconnects may extend to connect directly to respective conductors in and/or near a base of camera module 100, where the lower contact areas near the base are configured to be electrically connected to one or more system interconnects of a multifunction device via the respective conductors, thereby enabling communication with one or more processor(s), other control modules, electrical power sources, and/or electrical ground connections.

In one embodiment, lens barrel 105 and/or lens barrel holder 115 may include respective upper contact areas (i.e., holes, gaps, spaces, voids, pockets, depressions, notches, cavities, or room) corresponding to the locations of the electrical contact points on solid state lens 105 and substrate 120. In some embodiments, solid state lens 105 and/or substrate 120 may include upper contact areas (i.e., holes, gaps, spaces, voids, pockets, depressions, notches, or cavities. The respective upper and lower contact areas may thus be configured to provide space for respective upper and lower conductive connections 150A-D to be added during the assembly process of camera module 100, where the electrically conductive connections 150A-D at least partially fill in the contact areas to complete the respective electrically conductive connections between solid state lens 110, the top and bottom portions of conductive interconnects 145A-B, and substrate 120. The shapes of the upper and lower contact areas may vary in some embodiments based on whether the contact areas are configured to hold conductive adhesive or solder. In an embodiment, the number of contact areas in lens barrel 105 and/or lens barrel holder 115 may correspond to the number of conductive interconnects 145A-B and/or the number of electrical contact points on solid state lens 110 and substrate 120. In various embodiments, electrically conductive connections 150A-D may include electrically conductive adhesive, electrically conductive epoxy, electrically conductive glue, and/or electrically conductive low-temperature solder. In an embodiment, the conductive low-temperature solder may be configured to be attached to contact points on the ends of conductive interconnects 145A-B without melting or damaging the plastic material of lens barrel holder 115.

In the illustrated embodiment, substrate 120 may include a hole or cavity in the center corresponding to the optical axis of camera module 100 and electrical connections (bonding pads not illustrated) that are aligned to correspond to the positions of respective electrical connections on image sensor 125. Image sensor 125 may be configured to be mounted with a "flip chip" mount to the bottom of substrate 120, such that image sensor 125 is positioned to receive light through lens barrel 105. In other embodiments, image sensor 325 may be mounted on a top surface of substrate 120 without a flip-chip mount. In one embodiment, substrate 120 may include one or more additional electrical contacts (not illustrated) corresponding to respective electrical contacts on a flexible circuit board 140. Flexible circuit board 140 may also be connected to one or more control modules of a multifunction device, such as processor(s) 120. Substrate 120 may be attached to flexible circuit board, thereby enabling image sensor 125 to communicate with processor(s) 1020 via substrate 120 and flexible circuit board 140. In some embodiments, camera module 100 may include a stiffener 135 (e.g., a metal, ceramic, or plastic component) that provides a rigid base of camera module 100 and/or provides an electrical ground connection.

In an embodiment, a portion of lens barrel 105 may extend upward around the outer vertical edge of solid state lens 110, thereby providing a protective ring 155 around the outer circumference of solid state lens 110 to protect the edges of solid state lens 110 from damage. In some embodiments, a seal 160 composed of an adhesive, glue, epoxy, and/or rubber material may be positioned between protective ring 155 and the circumference of solid state lens 110 to prevent dust or other contaminants from entering lens barrel 105 and/or to hold solid state lens 110 in an aligned position with respect to the optical axis.

Figure 8:
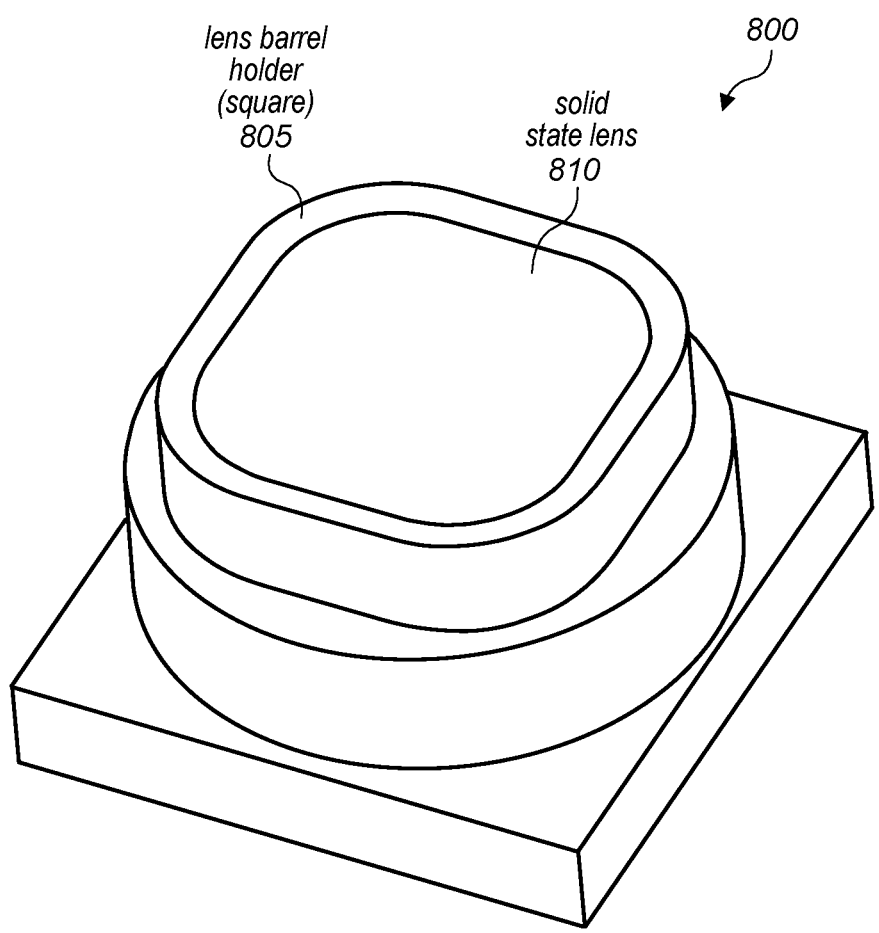
FIG. 8 is a logical block diagram illustrating an example camera module, according to some embodiments.

Please note that FIG. 1 is provided as merely an example of a camera module. Different combinations of the illustrated components (as well as components not illustrated) may be used to implement a camera module. For example, in some embodiments various lens shapes, lens barrel shapes, and/or lens barrel holder shapes may be implemented. In various embodiments, the shape of the lens, lens barrel, and/or lens barrel holder may be circular, square, rectangular, oval, parallelogram, or other shapes suitable for implementing a camera module. An example of an alternate shape is illustrated in FIG. 8, which is discussed below. Thus, the components of FIG. 1 and their respective layout or ordering is not intended to be limiting to the various other combinations which may be used by a camera module.

Figure 2A:
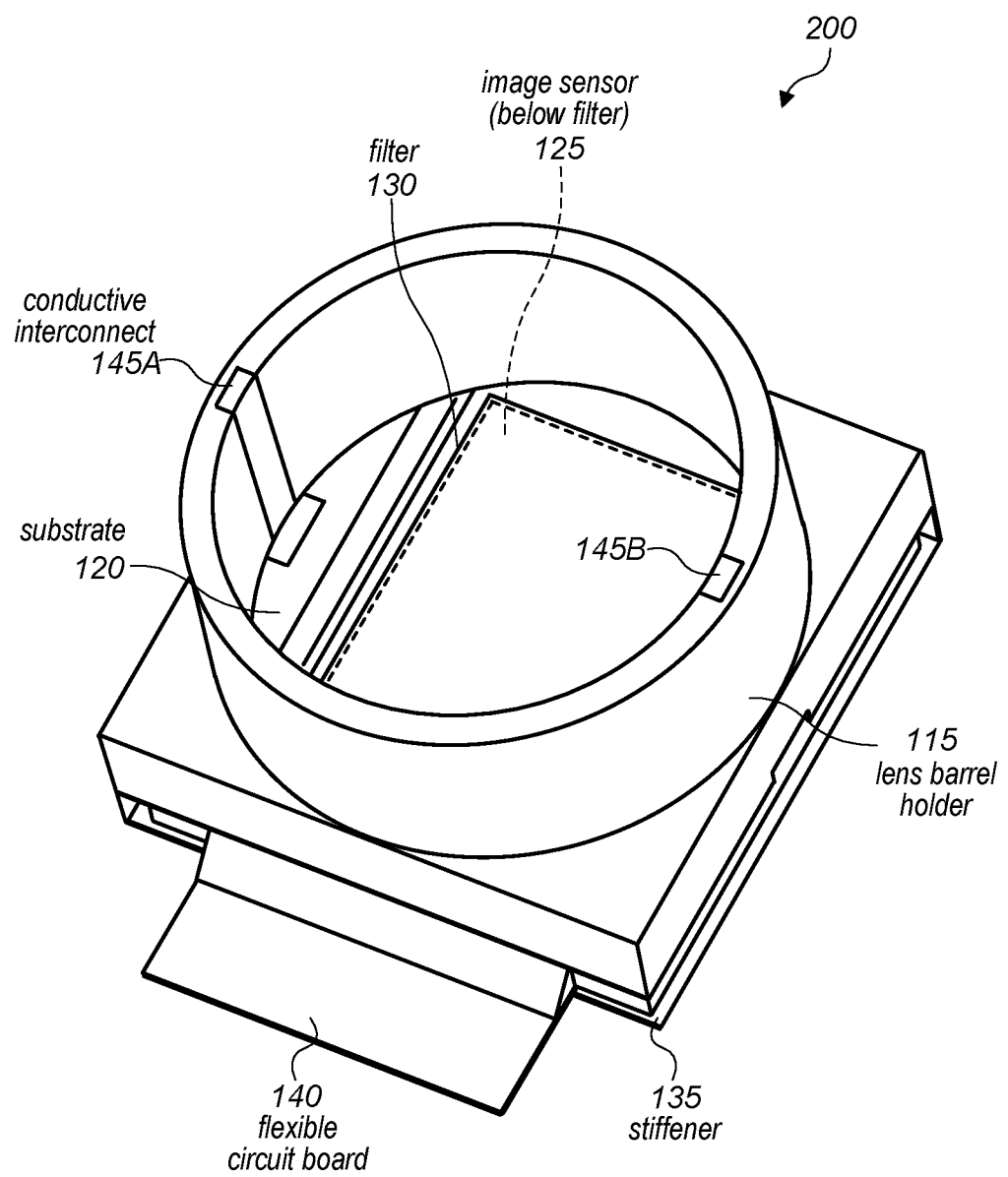
FIG. 2A is a logical block diagram illustrating an example camera module, according to some embodiments.

FIG. 2A is a logical block diagram illustrating an example camera module 200, according to some embodiments. As depicted, FIG. 2A is a top-down view of camera module 200, where the solid state lens and lens barrel have been removed for clarity of illustration. In one embodiment, camera module 200 may be configured similarly to camera module 100 of FIG. 1. In an embodiment, camera module 200 may include lens barrel holder 115, which has a circular or cylindrical barrel holder extending upward from the base. In other embodiments, other shapes may be used for the lens barrel holder. In one embodiment, camera module 200 may include substrate 120 mounted at least partially below lens barrel holder 115. An image sensor 125 may be configured to attach to substrate 120, and a filter 130 may be mounted above image sensor 125. In an embodiment, substrate 120 may attach to flexible circuit board 140, which is itself mounted on top of stiffener 135.

In an embodiment, lens barrel holder 115 may be a plastic and/or polymer material configured to have one or more electrically conductive interconnects integrated onto respective surfaces by a LDS manufacturing process and/or have one or more conductive interconnects molded and/or mechanically inserted during a plastic molding process. As illustrated in FIG. 2A, conductive interconnects 145A-B may be LDS electrical traces aligned substantially vertically along channels in or on an inside surface of the cylinder of lens barrel holder 115, as well as at least partially extending (e.g., partially overlapping or wrapping partially around) onto the horizontal top and bottom edges of the cylinder of lens barrel holder 115. In other embodiments, conductive interconnects 145A-B may not be in a straight line, but may instead be routed in different designs (e.g., zig-zags, spirals, diagonally, or the like) in order to accommodate the shape(s) of the lens barrel and/or lens barrel holder 115. For example, conductive interconnects 145A-B may be a shape other than a straight vertical line in some embodiments in order to minimize the potential effects of heat or physical stress from the assembly or use of camera module 200, or to minimize parasitic electrical interference. As noted above, lens barrel holder may be other non-cylindrical shapes in other embodiments, and conductive interconnects 145A-B may be positioned in a similar manner along the inner surface, top edge, and bottom edge of the other shapes.

Figure 2B:
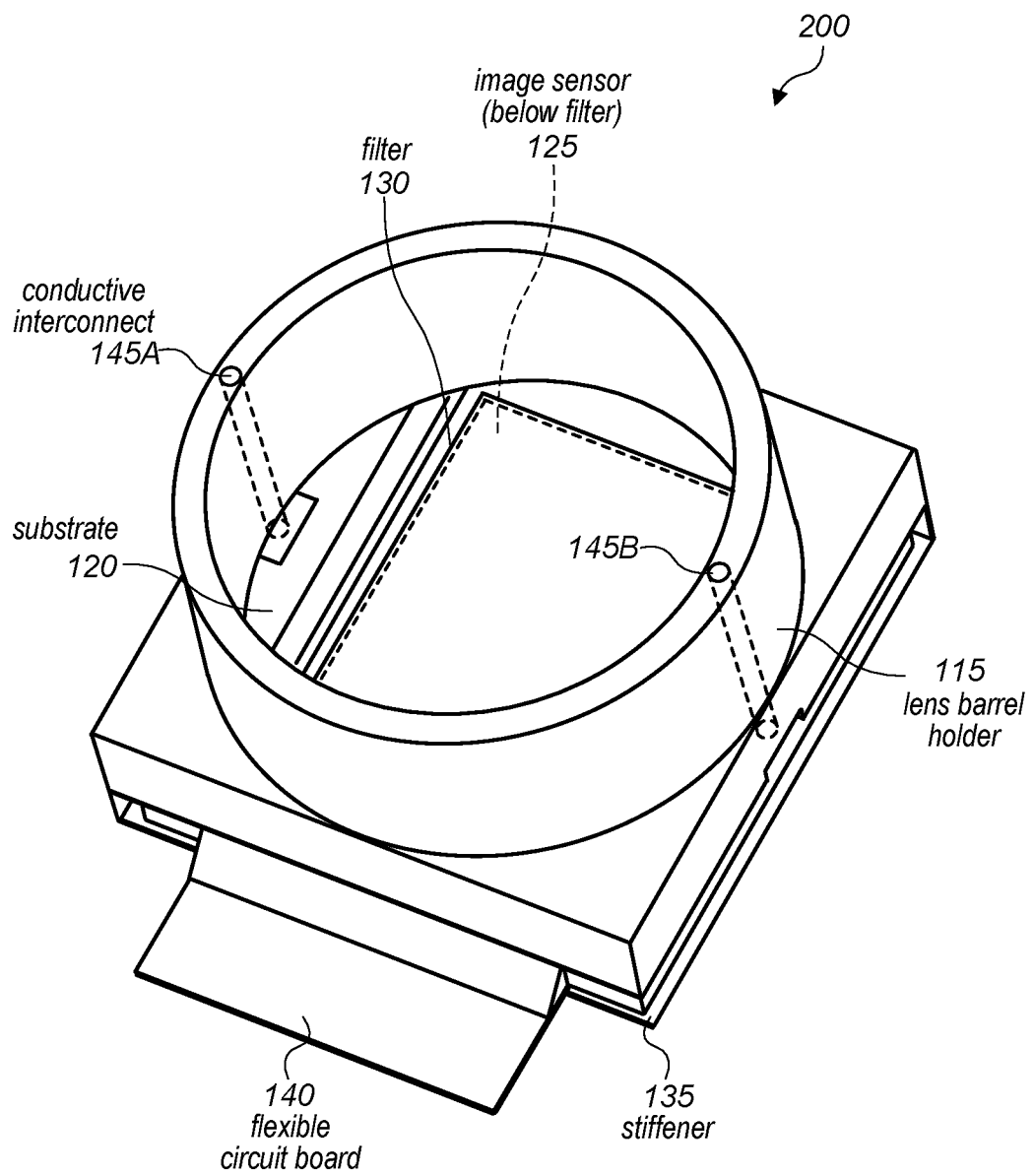
FIG. 2B is a logical block diagram illustrating an example camera module, according to some embodiments.

FIG. 2B is a logical block diagram illustrating an example camera module 200, according to some embodiments. As illustrated in FIG. 2B, electrically conductive interconnects 145A-B may be physically embedded in the middle of (e.g., inside) the wall(s) of lens barrel holder 115 during or after a plastic molding process of the lens barrel holder 115, such that the vertical rise of the conductive interconnects 145A-B may be surrounded by (and thus physically shielded by) plastic/polymer material. As depicted, the conductive interconnects 145A-B may be included in respective interior holes in lens barrel holder 115 and not exposed to the exterior of lens barrel holder 115, the interior surface of lens barrel holder 115, or the exterior surface of lens barrel holder 115. In some embodiments, an interior surface may include the inward-facing surface of lens barrel holder 115 (e.g., a surface of a wall facing towards the center of a cylinder or other lens barrel shape), and an exterior surface may include an externally-facing surface of lens barrel holder 115 (e.g., a surface of a wall facing towards the outside/exterior and away from the center of the lens barrel).

In various embodiments one or more electrical traces (e.g., metal wires or electrical interconnects made of an electrically conductive material) may be arranged inside a mold designed for lens barrel holder 115, and then plastic may be injected into the mold around the conductive traces, thereby forming lens barrel holder 115 with conductive interconnects 145A-B inside the walls of the lens barrel holder. In other embodiments, holes or cavities in the wall(s) of lens barrel holder 115 may be left open by the plastic molding process used to produce lens barrel holder 115, and electrically conductive interconnects 145A-B may subsequently be physically inserted into the holes (e.g., via a mechanical interconnect insertion process) and/or filled into the holes (e.g., deposited via an electrically conductive material deposition process), thereby forming lens barrel holder 115 with conductive interconnects 145A-B inside the wall(s) of lens barrel holder 115. In various embodiments, holes may instead be drilled, bored, carved, etched, and/or punched into the wall(s) of lens barrel holder 115, and electrically conductive interconnects 145A-B may subsequently be inserted, deposited, and/or filled into the holes.

Figure 3:
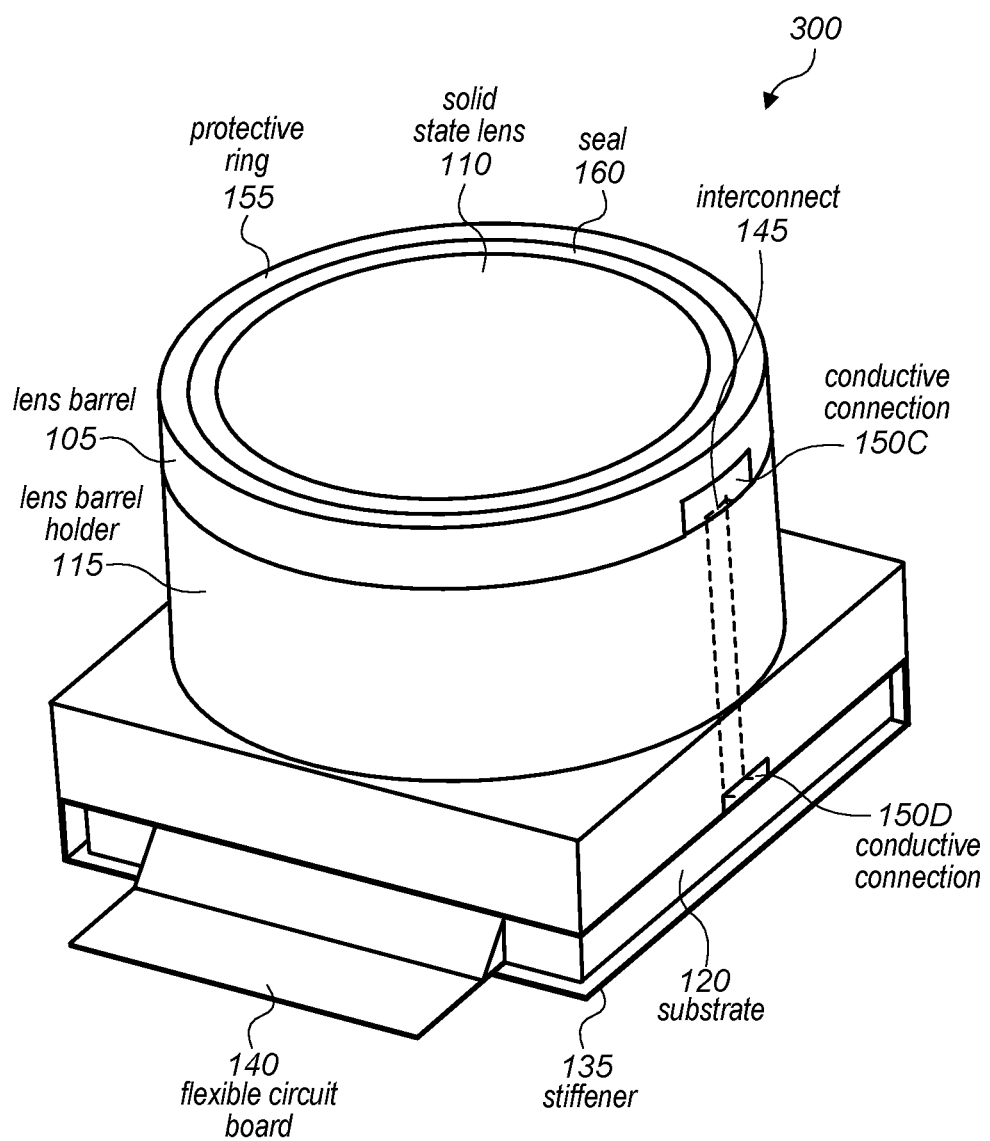
FIG. 3 is a logical block diagram illustrating an example camera module, according to some embodiments.
Figure 7A:
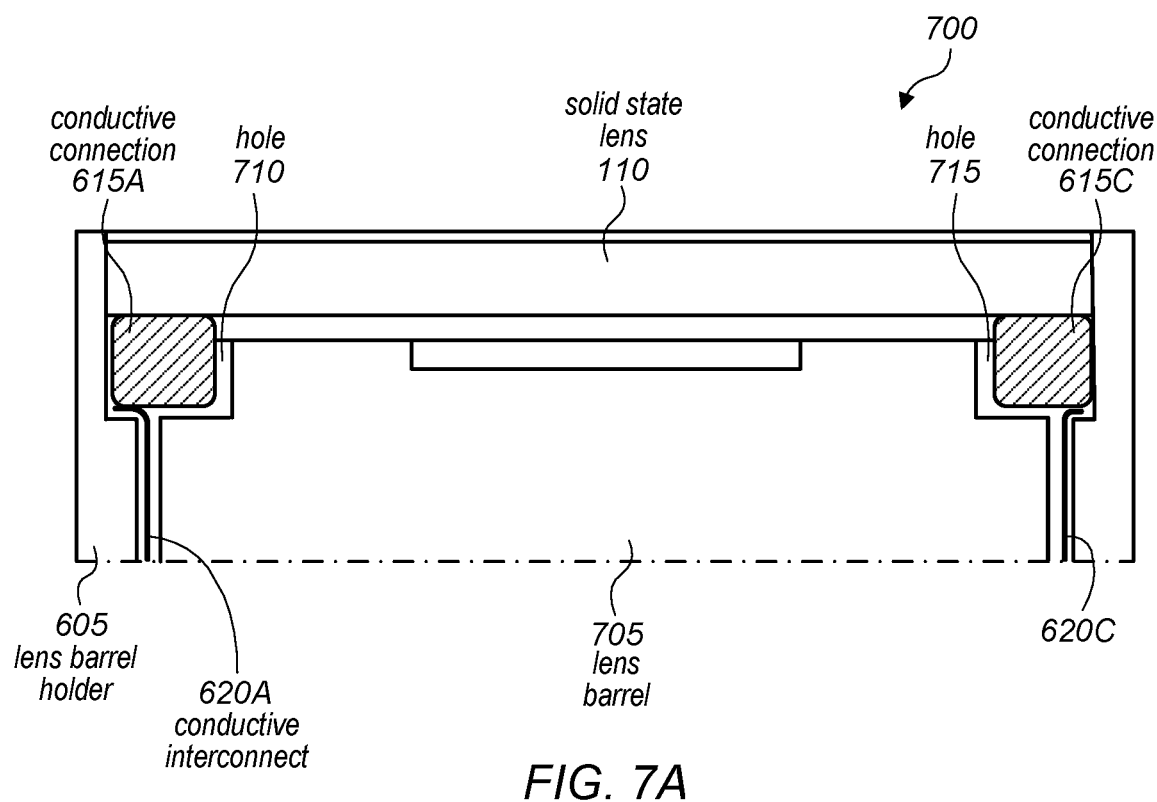
FIGS. 7A-B are logical block diagrams illustrating cross-sectional views of an example camera module, according to some embodiments.
Figure 7B:
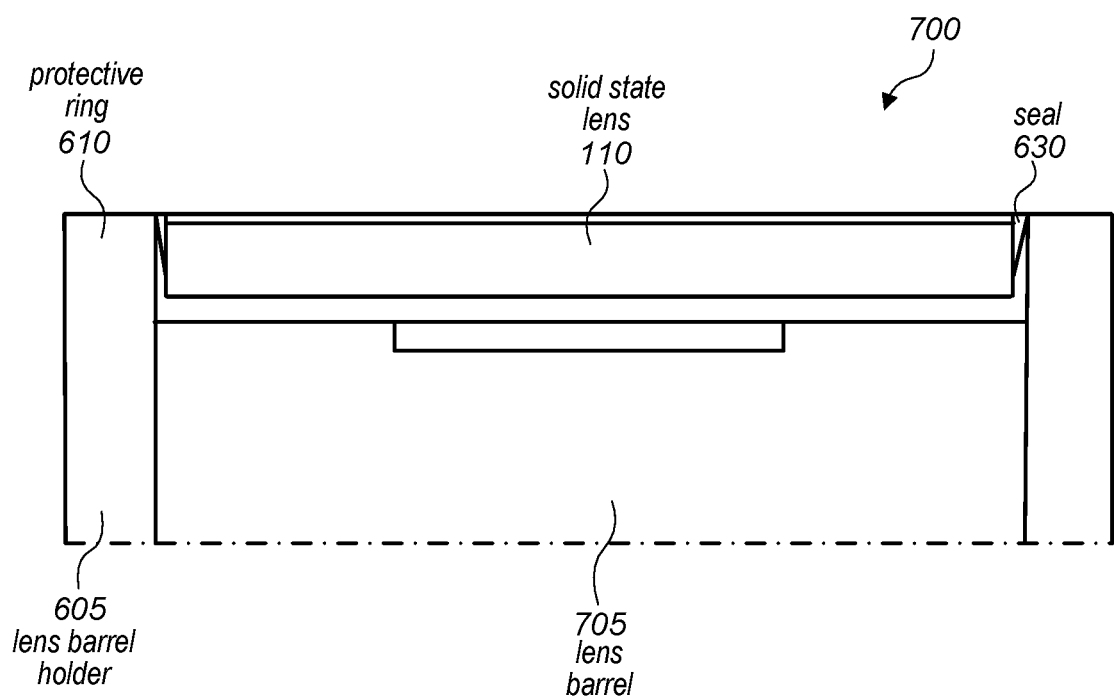

FIG. 3 is a logical block diagram illustrating an example camera module 300, according to some embodiments. As depicted, camera module 300 is a view of the sides and top of a camera module configured similarly to camera modules 100 and 200 of FIGS. 1 and 2, respectively. As illustrated in FIG. 3, camera module 300 may include solid state lens 110 attached to lens barrel 105 within a protective ring 155 formed by an upper extension of lens barrel 105. In other embodiments a protective ring may instead be formed by an extension of the lens barrel holder, as illustrated in FIGS. 7A-7B. As illustrated in FIG. 3, the lower portion of lens barrel 105 is mounted inside lens barrel holder 115, which supports lens barrel 105 and hold lens barrel 105 above substrate 120. In one embodiment, seal 160 may be included between protective ring 155 and the circumferential edge of solid state lens 110.

In an embodiment, substrate 120 is attached to flexible circuit board 140, which is attached to a stiffener 135. In one embodiment, a portion of flexible circuit board 140 may extend laterally outside (e.g., horizontally beyond) the base of lens barrel holder 115, and the extended portion of flexible circuit board 140 may include one or more electrical contacts configured to be connected to interconnects of a multifunction device, such as portable multifunction device 1000 of FIGS. 10 and 11, thereby communicatively connecting the image sensor on substrate 120 with control modules, such as the one or more processor(s) 1020 of FIG. 10.

In one embodiment, multiple electrically conductive connections may be included in contact areas in lens barrel 105 and/or lens barrel holder 115. For example, conductive connection 150C may be a conductive adhesive or solder in a contact area near the top of lens barrel 105, and conductive connection 150C may electrically connect solid state lens 110 to an upper portion of a respective conductive interconnect integrated on an inner surface of lens barrel holder 115. As illustrated, the conductive interconnect is not exposed to the outside of camera module 300 and is thus protected from damage. In an embodiment, conductive connection 150D may be a conductive adhesive or solder in a contact area near the bottom (i.e., in the base) of lens barrel holder 115, and conductive connection 150D may electrically connect substrate 120 to a lower portion of the respective conductive interconnect. In one embodiment, conductive connection 150D may be a conductive adhesive or solder in a contact area on substrate 120 (e.g., a depression in the substrate).

Figure 4A:
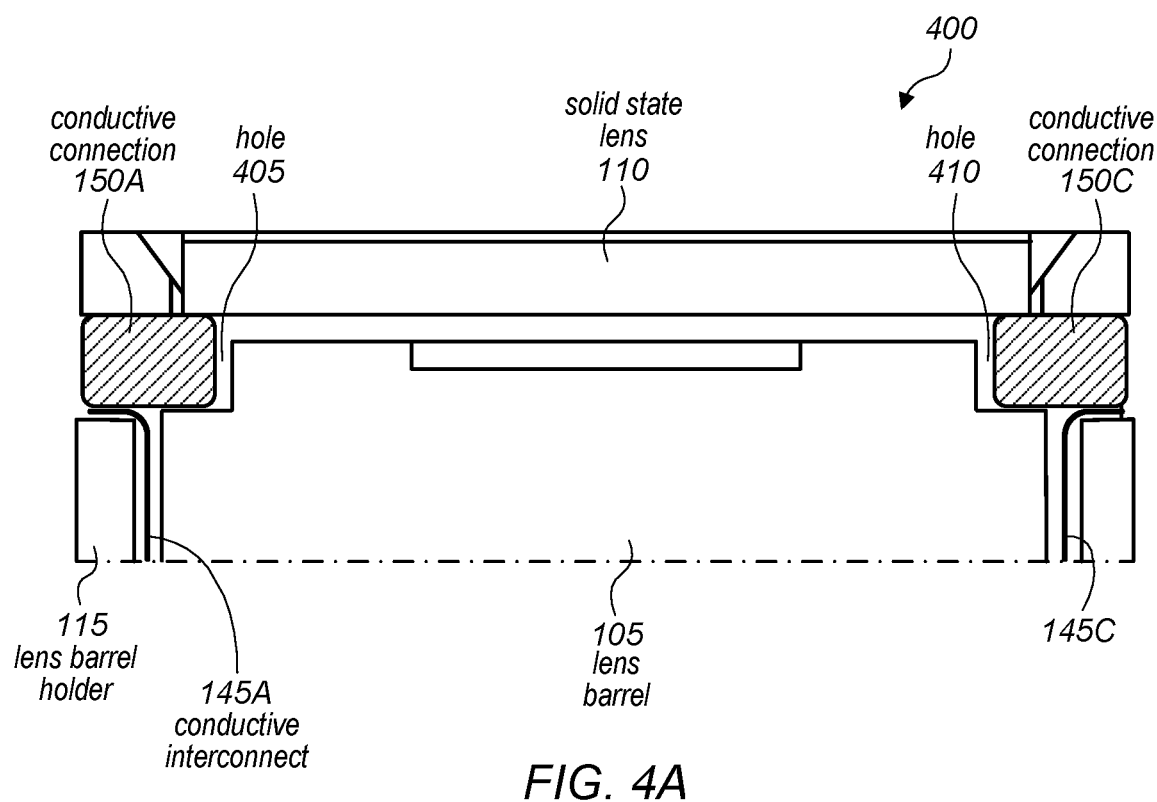
FIGS. 4A-B are logical block diagrams illustrating cross-sectional views of an example camera module, according to some embodiments.
Figure 4B:
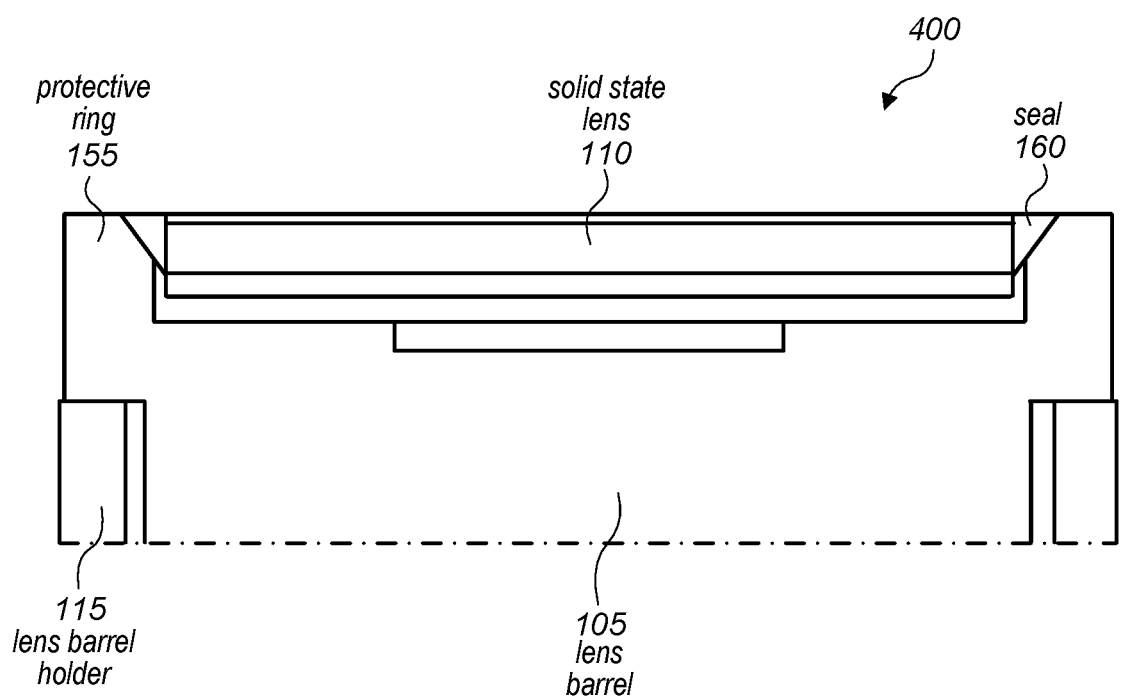

FIGS. 4A-B are logical block diagrams illustrating cross-sectional views of an example camera module 400, according to some embodiments. In an embodiment, camera module 400 may be configured similarly to camera modules 100, 200, and 300 of FIGS. 1-3, respectively.

FIG. 4A is a cross section of an upper portion of camera module 400 viewed from the perspective of a horizontal axis that corresponds to the locations of electrically conductive connections 150A and 150B and corresponding electrically conductive interconnects 145A and 145C, respectively. In an embodiment, camera module 400 may include lens barrel 105, solid state lens 110, lens barrel holder 115, conductive interconnects 145A and 145C, and respective upper conductive connections 150A and 150C. Although conductive interconnects 145A and 145C are depicted as slightly offset from the wall of lens barrel holder 115 for clarity of illustration, as described above, conductive interconnects 145A and 145C may be deposited onto the inside surface of the wall of lens barrel holder 115 during manufacturing, partially integrated into the inner surface of the wall, or fully integrated into the inside (e.g., in the middle) of the wall of lens barrel holder 115 in various embodiments.

In one embodiment, lens barrel 105 and/or lens barrel holder 115 may include a contact area 405 configured to provide an available volume sufficient to hold conductive connection 150A. Similarly, another respective contact area 410 may be configured to provide space occupied by conductive connection 150C during assembly of camera module 400. In various embodiments, the conductive connections may completely fill the contact areas or partially fill the contact areas. In other words, in some embodiments a portion of empty space may remain after installation of the conductive connections in the contact areas.

In an embodiment, the upper portions of conductive interconnects 145A and 145C extend from the vertical inside surface of lens barrel holder 115 onto an upper horizontal edge of lens barrel holder 115, such that the upper portions of conductive interconnects 145A and 145C make conductive contact with conductive connections 150A and 150C, respectively. In one embodiment, conductive connections 150A and 150C may be sufficiently sized to extend from the upper portions of conductive interconnects 145A and 145C, respectively, to the lower surface of solid state lens 110, thereby providing electrical connectivity between solid state lens 110 and conductive interconnects 145A and 145C. In some embodiments, conductive connections 150A and 150C may include conductive glue or low temperature solder, and may thus also serve to bond, join, attach, or otherwise hold together solid state lens 110, lens barrel 105, and lens barrel holder 115. Conductive connections 150A and 150C may thus provide both electrical connectivity and physical bonding to various components of camera module 400.

FIG. 4B is a cross section of camera module 400 along an axis that does not correspond to the locations of conductive connections 150A and 150C and/or corresponding conductive interconnects 145A and 145C, respectively. In other words, FIG. 4B is a cross section along a different horizontal axis of camera module 400 where the electrical connections are not present. Camera module 400 of FIG. 4B is thus the same camera module 400 illustrated in 4A, just from a different perspective.

In an embodiment, lens barrel 105 may include a portion that extends upward, illustrated by protective ring 155, to surround the circumference of the lateral edge of solid state lens 110, thereby providing physical protection to the edge of the lens. In one embodiment, seal 160 (e.g., adhesive, epoxy, glue, and/or a rubber gasket) may be affixed between the edges of protective ring 155 and solid state lens 110. Although FIG. 4B depicts protective ring 155 as being an extension of lens barrel 105, in other embodiments protective ring 155 may be an extension of lens barrel holder 115.

In some embodiments, protective ring 155 may extend upward above the top (i.e., externally facing) surface of 110, such that if camera module is ever inadvertently inverted and placed top-down on a surface (e.g., if portable multifunction device 1000 is laid face down on a table) protective ring 155 makes contact with the surface while the outer surface of solid state lens 110 does not make contact with the surface, thereby preventing solid state lens 110 from being scratched. In other words, solid state lens 110 may be mounted at a recessed level relative to the top of protective ring 155.

Figure 5:
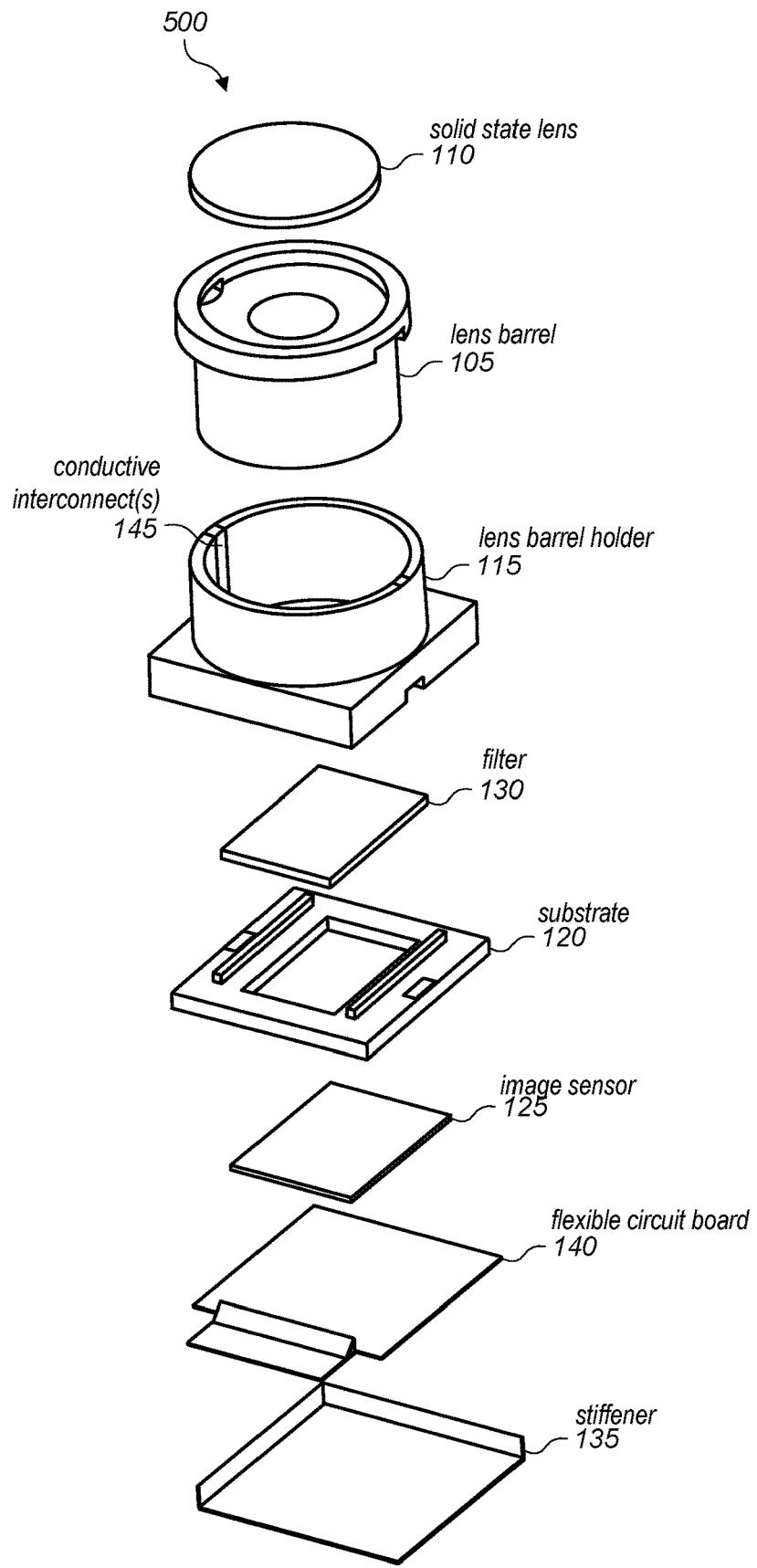
FIG. 5 is a logical block diagram illustrating an example camera module, according to some embodiments.

FIG. 5 is a logical block diagram illustrating an example "exploded view" of various components of camera module 500, according to some embodiments. In an embodiment, camera module 500 may be configured similarly to the camera modules of FIGS. 1-4 and may thus include solid state lens 110, lens barrel 105, and lens barrel holder 115. In one embodiment, lens barrel 105 may be shaped to support and hold solid state lens 110 near the top of lens barrel 105. In some embodiments, lens barrel 105 may include multiple upper contact areas that are shaped to provide space for conductive connections like conductive adhesive or solder, such that the conductive connections may make physical and electrical contact with respective areas on the lower surface of solid state lens 110. In other embodiments, contact areas may be included in lens barrel holder 115 either in addition to or instead of, including contact areas in lens barrel 105. Similarly, in some embodiments contact areas may be included in solid state lens 110 and/or substrate 120.

In one embodiment, lens barrel holder 115 may include one or more electrically conductive interconnect(s) 145 on an inwardly facing surface of lens barrel holder 115, partially embedded in the vertical wall of lens barrel holder 115, and/or enclosed within the vertical wall of lens barrel holder 115. In other embodiments, one or more electrically conductive interconnect(s) may be included on a surface of lens barrel 105, partially embedded in the vertical wall of lens barrel 105 and/or enclosed within the vertical wall of lens barrel 105.

In an embodiment, camera module 500 may include filter 130 configured to be mounted above substrate 120, and substrate 120 may be configured (e.g., with flip-chip mounting attachment points) to attach to image sensor 125 while providing an optical path along the optical axis of camera module 500 to image sensor 125. In other words, substrate 120 may have a rectangular, square, circular, oval, or other shaped hole or cavity in its center. In some embodiments, substrate 120 may also include one or more discrete components (e.g., capacitors), as illustrated by the raised portions on the upper surface of substrate 120 in FIG. 5. In one embodiment, substrate 120 may include electrical contacts and/or bonding locations configured to attach to flexible circuit board 140, and flexible circuit board 140 may be attached to stiffener 135.

Figure 6:
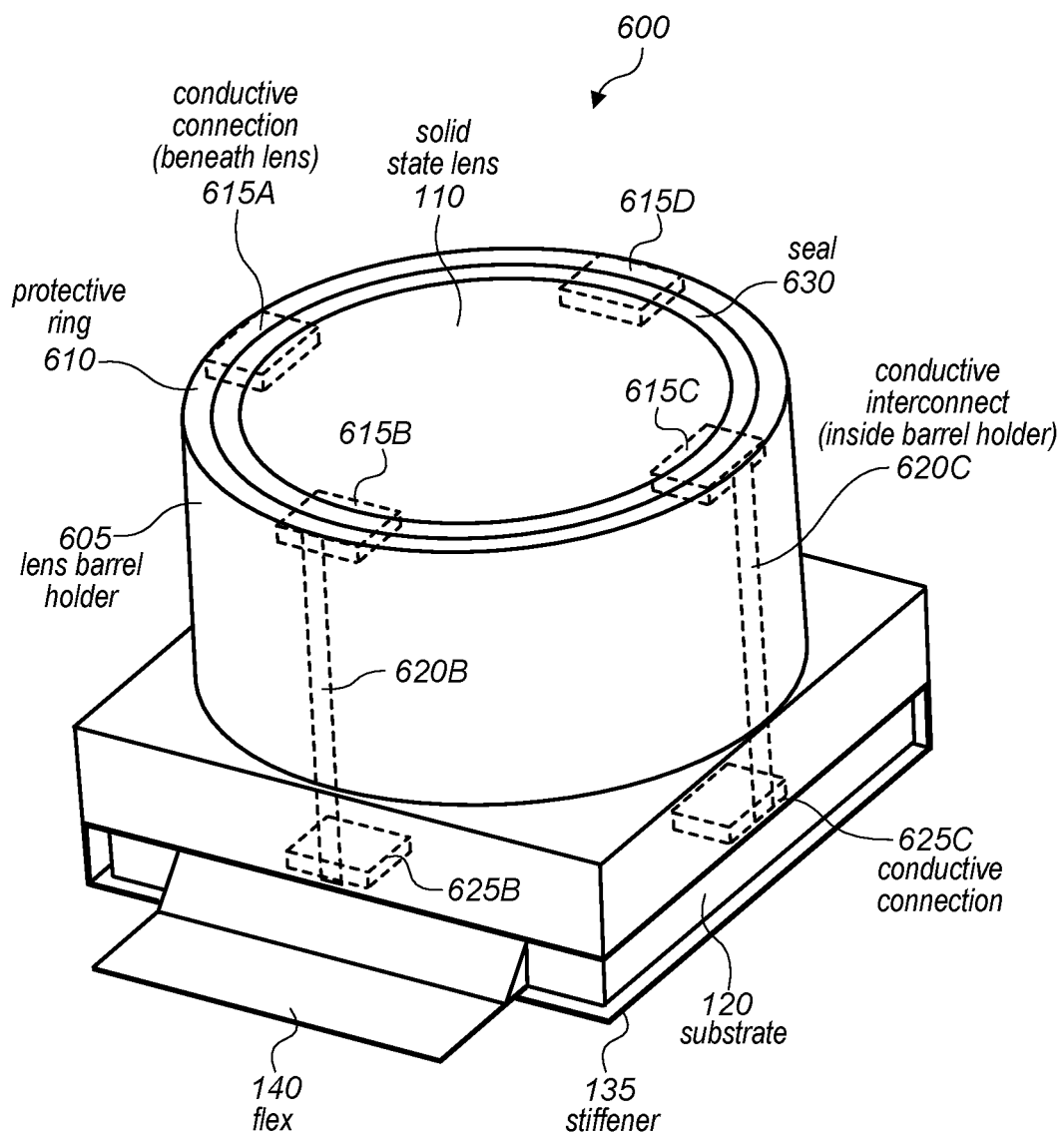
FIG. 6 is a logical block diagram illustrating an example camera module, according to some embodiments.

FIG. 6 is a logical block diagram illustrating an example camera module 600, according to some embodiments. In an embodiment, camera module 600 may be configured similarly to the camera modules of FIGS. 1-5. In one embodiment, camera module 600 may include lens barrel holder 605, which may extend upward around the outer circumference of solid state lens 110, thereby providing a physical barrier illustrated as protective ring 610 to guard the edges of solid state lens 110 and help minimize the likelihood of solid state lens 110 being damaged when camera module 600 makes contact with external objects. FIG. 6 thus depicts an embodiment where protective ring 610 is formed as an extension of lens barrel holder 605, while FIG. 3 (discussed above) depicts an embodiment where protective ring 155 is part of lens barrel 105.

As described above, lens barrel holder 605, the corresponding lens barrel, substrate 120, and/or solid state lens 110 may include multiple respective contact areas corresponding to each of electrically conductive connections 615A-D. In an embodiment, upper conductive connections 615A-D are located at least partially below solid state lens 110 and make both physical and conductive contact with solid state lens 110. Similarly, multiple respective lower conductive connections (including conductive connection 625C as well as those not illustrated) are attached to the lower portions of each respective conductive interconnect. Although only conductive interconnects 620B and 620C are shown for clarity of illustration, camera module 600 may include a separate respective conductive interconnect corresponding to each of upper conductive connections 615A-D and also the lower conductive connections (e.g., 625C), where the different respective conductive interconnects (i.e., conductive interconnects 620B and 620C, as well as those not shown) are attached to and/or at least partially integrated with an interior portion of lens barrel holder 605. In other embodiments, the different respective conductive interconnects are attached to and/or at least partially integrated with an interior portion of the lens barrel itself.

Although FIG. 6 depicts a set of four upper conductive connections 615A-D configured to provide electrical connectivity with four corresponding conductive interconnects (of which only 620B and 620C are shown) and also four corresponding lower conductive connections (of which only 625C is shown), in various embodiments a camera module may include other numbers of conductive interconnects and corresponding upper/lower conductive connections.

FIGS. 7A-B are logical block diagrams illustrating cross-sectional views of an example camera module 700, according to some embodiments. In one embodiment, camera module 700 of FIGS. 7A-B may be configured similarly to camera module 600 of FIG. 6, in that a portion of lens barrel holder 605 may extend upward at least partially along the level of solid state lens 110 to form a protective ring, as illustrated by protective ring 610 as an extension of lens barrel holder 605 in FIG. 7B.

FIG. 7A is a cross section of an upper portion of camera module 700 viewed from the perspective of a horizontal axis that corresponds to the locations of electrically conductive connections 615A and 615C and corresponding electrically conductive interconnects 620A and 620C, respectively. In an embodiment, camera module 700 may include lens barrel 705, solid state lens 110, lens barrel holder 605, conductive interconnects 620A and 620C, and respective upper conductive connections 615A and 615C. Although conductive interconnects 620A and 620C are depicted as slightly offset from the wall of lens barrel holder 605 for clarity of illustration, as described above, conductive interconnects 620A and 620C may be deposited onto the inside surface of the wall of lens barrel holder 605 during manufacturing, partially integrated into the inner surface of the wall, or fully integrated into the inside (e.g., in the middle) of the wall of lens barrel holder 605 in various embodiments.

In one embodiment, lens barrel 705 and/or lens barrel holder 605 may include a contact area 710 configured to provide an available volume sufficient to hold conductive connection 615A. Similarly, another respective contact area 715 may be configured to provide space occupied by conductive connection 615C during assembly of camera module 700. In various embodiments, the conductive connections may completely fill the contact areas or partially fill the contact areas. In other words, in some embodiments a portion of empty space may remain after installation of the conductive connections in the contact areas.

In an embodiment, the upper portions of conductive interconnects 620A and 620C extend from the vertical inside surface of lens barrel holder 605 at least partially onto an upper horizontal edge, lip, or shelf of lens barrel holder 605, such that the upper portions of conductive interconnects 620A and 620C make conductive contact with conductive connections 615A and 615C, respectively. In one embodiment, conductive connections 615A and 615C may be sufficiently sized to extend from the upper portions of conductive interconnects 620A and 620C, respectively, at least partially to the lower surface of solid state lens 110, thereby providing electrical connectivity between solid state lens 110 and conductive interconnects 620A and 620C. In some embodiments, conductive connections 615A and 615C may include conductive adhesive or low temperature solder, and may thus also serve to bond, join, attach, or otherwise hold together solid state lens 110, lens barrel 705, and lens barrel holder 605. Conductive connections 615A and 615C may thus provide both electrical connectivity and physical bonding to various components of camera module 700.

FIG. 7B is a cross section of camera module 700 along an axis that does not correspond to the locations of conductive connections 615A and 615C and/or corresponding conductive interconnects 620A and 620C, respectively. In other words, FIG. 7B is a cross section along a different horizontal axis of camera module 700 where the electrical connections are not present. Camera module 700 of FIG. 7B is thus the same camera module 700 illustrated in 7A, just from a different perspective. As discussed above, FIG. 7B depicts an embodiment in which protective ring 610 is part of lens barrel 605. In other embodiments, such as FIG. 4B, a protective ring 155 may be part of a lens barrel 105.

FIG. 8 is a logical block diagram illustrating an example camera module 800, according to some embodiments. In one embodiment, camera module 800 may include a square lens barrel holder 805 configured to hold and support a square lens barrel attached to a square solid state lens 810. In other embodiments, lens barrel 805, solid state lens 810, and/or the corresponding lens barrel may be shapes other than squares, such as rectangles, hexagons, octagons, pentagrams, circles, ovals, or the like.

FIGS. 1-8 provide examples of a camera module, which may implement a protected electrical interconnect and a protected solid state lens. However, numerous other types or configurations of systems or devices may implement protected electrically conductive connections and solid state lenses, such as camera modules having various shapes of solid state lenses, lens barrels, and/or lens barrel holders. Similarly, camera modules may implement various types of electrically conductive epoxies, electrically conductive glues, and/or electrically conductive low temperature solders to connect components of the camera module conductively and/or physically. While in some embodiments, different manufacturing processes may be used to form, deposit, install, or otherwise add the electrically conductive interconnects to the lens barrel holder and/or the lens barrel, where the manufacturing techniques may include, but not be limited to laser direct structuring (LDS), plastic injection molding, plastic molding, manual wire insertion, automatic wire insertion, or the like.

Figure 9:
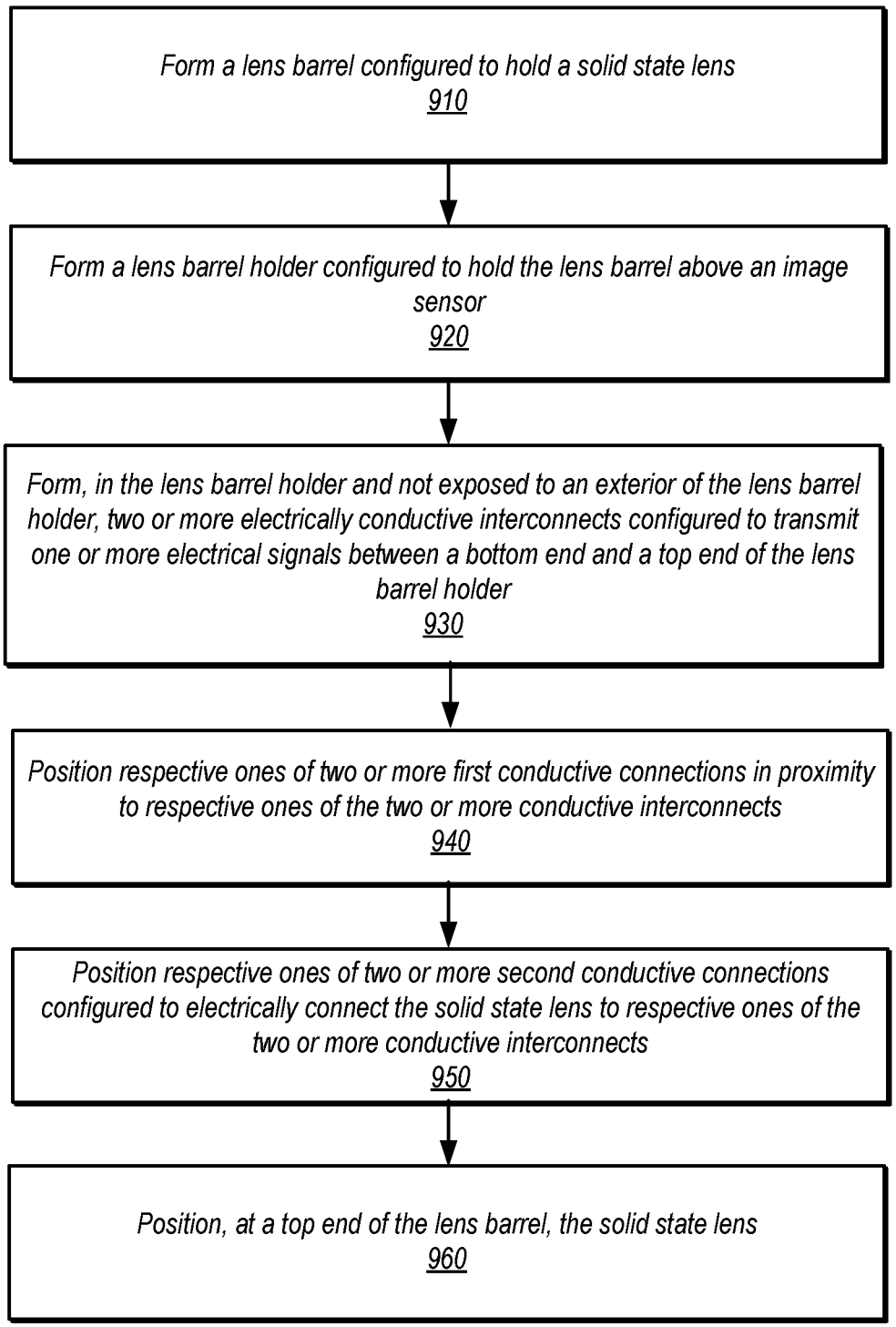
FIG. 9 is a high-level flowchart illustrating various methods and techniques for manufacturing a camera module, according to some embodiments.

FIG. 9 is a high-level flowchart illustrating various methods and techniques for manufacturing a camera module, according to some embodiments. The various components described above may implement these techniques (in addition to those described with regard to FIGS. 10-12 below), as well as various other methods of manufacture.

As indicated at 910, a method of manufacturing a camera module having a protected electrically conductive interconnect and a solid state lens may include forming a lens barrel configured to hold a solid state lens on an optical axis of the camera module. In various embodiments, the lens barrel, the solid state lens, and/or the lens barrel holder may include two or more upper contact areas in proximity to a top (or located towards an upper end) of the camera module.

As indicated at 920, the method may include forming a lens barrel holder configured to hold the lens barrel above an image sensor. In an embodiment, the lens barrel holder may include two or more lower contact areas in proximity to a bottom end of the lens barrel holder (i.e., lower contact areas in proximity to a lower portion of the lens barrel holder). In one embodiment, the image sensor may be mounted on a substrate. In another embodiment, the image sensor may be mounted on the bottom of the lens barrel or to another component at the base of the camera module.

As indicated at 930, the method may include forming, in the lens barrel holder, two or more conductive interconnects configured to transmit respective ones of one or more electrical signals between a bottom end of the lens barrel holder in proximity to the substrate and a top end of the lens barrel holder in proximity to the solid state lens, where the conductive interconnect is not exposed to an exterior of the lens barrel holder. In some embodiments, an interior surface may include the inward-facing surface of a lens barrel holder (e.g., a surface of a wall facing towards the center of a cylinder or other lens barrel shape), and an exterior or exterior surface may include an externally-facing surface of the lens barrel holder (e.g., a region or surface of a wall facing towards the outside/exterior and away from the center of the lens barrel).

As indicated at 940, the method may include positioning, in the two or more lower contact areas, respective ones of two or more lower conductive connections between the substrate and respective ones of the two or more conductive interconnects. In some embodiments, the two or more lower conductive connections may electrically connect to conductive interconnects to a substrate and/or other electrical contact points (e.g., electrical connections on a flexible circuit board and/or electrical connections on one or more system interconnects of a multifunction device), thereby electrically connecting the conductive interconnects of the camera module to one or more processor(s) or other control modules of the multifunction device. In an embodiment, the two or more lower conductive connections may also provide a physical bonding or attachment between the lens barrel holder and one or more other components at the base of the camera module, such as a substrate, a flexible circuit board, a base plate, or one or more electrical traces below the camera module.

As indicated at 950, the method may include positioning, in the two or more upper contact areas, respective ones of two or more upper conductive connections configured to electrically connect the solid state lens to respective ones of the two or more conductive interconnects.

As indicated at 960, the method may include positioning, at the top end of the lens barrel, the solid state lens. The solid state lens may be configured to flex, in response to one or more electric signals to change a focus of the camera module and/or to dynamically adjust one or more characteristics of an image received by the camera module.

In some embodiments, the method may include curing the upper and/or lower electrically conductive connections. For example, the method may include curing the upper and/or lower conductive connections via an ultraviolet (UV) adhesive curing process, a heat-based adhesive curing process, and/or a heat-based solder flow process.

Attention is now directed toward embodiments of portable devices with cameras. One example of a system that is configured to implement any or all of the techniques described herein is illustrated in FIG. 10. For example, portable multifunction device 1000 may include camera 1064 in accordance with some embodiments. Camera 1064 is sometimes called an "optical sensor" for convenience, and may also be known as or called an optical sensor system. Device 1000 may include memory 1002 (which may include one or more computer readable storage mediums), memory controller 1022, one or more processing units (CPU's) 1020, peripherals interface 1018, RF circuitry 1008, audio circuitry, a speaker, touch-sensitive display system 1012, a microphone, input/output (I/O) subsystem 1006, other input or control devices 1016, and external port 1024. Device 1000 may include one or more optical sensors 1064. These components may communicate over one or more communication buses or signal lines.

It should be appreciated that device 1000 is only one example of a portable multifunction device, and that device 1000 may have more or fewer components than shown, may combine two or more components, or may have a different configuration or arrangement of the components. The various components shown in FIG. 10 may be implemented in hardware, software, or a combination of hardware and software, including one or more signal processing and/or application specific integrated circuits.

Memory 1002 may include high-speed random access memory and may also include non-volatile memory, such as one or more magnetic disk storage devices, flash memory devices, or other non-volatile solid-state memory devices. Access to memory 1002 by other components of device 1000, such as CPU 1020 and the peripherals interface 1018, may be controlled by memory controller 1022.

Peripherals interface 1018 can be used to couple input and output peripherals of the device to CPU 1020 and memory 1002. The one or more processors 1020 run or execute various software programs and/or sets of instructions stored in memory 1002 to perform various functions for device 1000 and to process data.

In some embodiments, peripherals interface 1018, CPU 1020, and memory controller 1022 may be implemented on a single chip, such as chip 1004. In some other embodiments, they may be implemented on separate chips.

RF (radio frequency) circuitry 1008 receives and sends RF signals, also called electromagnetic signals. RF circuitry 1008 converts electrical signals to/from electromagnetic signals and communicates with communications networks and other communications devices via the electromagnetic signals. RF circuitry 1008 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1008 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry, a speaker, and a microphone provide an audio interface between a user and device 1000. Audio circuitry may receive audio data from peripherals interface 1018, converts the audio data to an electrical signal, and transmits the electrical signal to a speaker. The speaker may convert the electrical signal to human-audible sound waves. Audio circuitry may also receive electrical signals converted by the microphone from sound waves. Audio circuitry may convert the electrical signal to audio data and transmits the audio data to peripherals interface 1018 for processing. Audio data may be retrieved from and/or transmitted to memory 1002 and/or RF circuitry 1008 by peripherals interface 1018.

I/O subsystem 1006 couples input/output peripherals on device 1000, such as touch screen 1012 and other input control devices 1016, to peripherals interface 1018. I/O subsystem 1006 may include display controller 1056 and one or more input controllers 1060 for other input or control devices. The one or more input controllers 1060 receive/send electrical signals from/to other input or control devices 1016. The other input control devices 1016 may include physical buttons (e.g., push buttons, rocker buttons, etc.), dials, slider switches, joysticks, click wheels, and so forth. In some alternate embodiments, input controller(s) 1060 may be coupled to any (or none) of the following: a keyboard, infrared port, USB port, and a pointer device such as a mouse. The one or more buttons may include an up/down button for volume control of a speaker and/or a microphone. The one or more buttons may include a push button (e.g., a power button).

Touch-sensitive display 1012 provides an input interface and an output interface between the device and a user. Display controller 1056 receives and/or sends electrical signals from/to touch screen 1012. Touch screen 1012 displays visual output to the user. The visual output may include graphics, text, icons, video, and any combination thereof (collectively termed "graphics"). In some embodiments, some or all of the visual output may correspond to user-interface objects.

Touch screen 1012 may have a touch-sensitive surface, sensor or set of sensors that accepts input from the user based on haptic and/or tactile contact. Touch screen 1012 and display controller 1056 (along with any associated modules and/or sets of instructions in memory 1002) detect contact (and any movement or breaking of the contact) on touch screen 1012 and converts the detected contact into interaction with user-interface objects (e.g., one or more soft keys, icons, web pages or images) that are displayed on touch screen 1012. In an exemplary embodiment, a point of contact between touch screen 1012 and the user corresponds to a finger of the user.

Touch screen 1012 may use LCD (liquid crystal display) technology, LPD (light emitting polymer display) technology, or LED (light emitting diode) technology, although other display technologies may be used in other embodiments. Touch screen 1012 and display controller 1056 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1012.

Device 1000 also includes power system 1062 for powering the various components. Power system 1062 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1000 may also include one or more optical sensors or cameras 1064. FIG. 10 shows an optical sensor coupled to optical sensor controller 1058 in I/O subsystem 1006. Optical sensor 1064 may include charge-coupled device (CCD), complementary metal-oxide semiconductor (CMOS) phototransistors, and/or photodiodes. Optical sensor 1064 receives light from the environment, projected through one or more lens, and converts the light to data representing an image. In conjunction with imaging module 1043 (also called a camera module), optical sensor 1064 may capture still images or video. In some embodiments, an optical sensor is located on the back of device 1000, opposite touch screen display 1012 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display. The camera modules of FIGS. 1-9 may thus be located, positioned, or installed on the front of device 1000 and/or on the back of device 1000 in various embodiments.

Device 1000 may also include one or more proximity sensors. The proximity sensor(s) may be coupled to peripherals interface 1018. Alternately, proximity sensor(s) may be coupled to input controller 1060 in I/O subsystem 1006. In some embodiments, the proximity sensor turns off and disables touch screen 1012 when the multifunction device is placed near the user's ear (e.g., when the user is making a phone call).

Device 1000 may include one or more orientation sensors. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1000. In some embodiments, the one or more orientation sensors include any combination of orientation/rotation sensors. The one or more orientation sensors may be coupled to peripherals interface 1018. Alternately, the one or more orientation sensors may be coupled to an input controller 1060 in I/O subsystem 1006. In some embodiments, information is displayed on the touch screen display in a portrait view or a landscape view based on an analysis of data received from the one or more orientation sensors.

In some embodiments, the software components stored in memory 1002 include operating system 1026, a communication module (or set of instructions), a contact/motion module (or set of instructions), a graphics module (or set of instructions), a text input module (or set of instructions), a Global Positioning System (GPS) module (or set of instructions), a device/global internal state, and applications (or sets of instructions) 1036. A device/global internal state may include one or more of: active application state, indicating which applications, if any, are currently active; display state, indicating what applications, views or other information occupy various regions of touch screen display 1012; sensor state, including information obtained from the device's various sensors and input control devices 1016; and location information concerning the device's location and/or attitude.

Operating system 1026 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A communication module may facilitate communication with other devices over one or more external ports 1024 and also includes various software components for handling data received by RF circuitry 1008 and/or external port 1024. External port 1024 (e.g., Universal Serial Bus (USB), FIREWIRE, etc.) is adapted for coupling directly to other devices or indirectly over a network (e.g., the Internet, wireless LAN, etc.). In some embodiments, the external port may be a multi-pin connector.

A contact/motion module may detect contact with touch screen 1012 (in conjunction with display controller 1056) and other touch sensitive devices (e.g., a touchpad or physical click wheel). The contact/motion module may include various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module may receive contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, a contact/motion module and/or display controller 1056 may detect contact on a touchpad.

A graphics module may include various known software components for rendering and displaying graphics on touch screen 1012 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like. A text input module, which may be a component of the graphics module, provides soft keyboards for entering text in various applications that need text input.

A GPS module may determine the location of the device and provides this information for use in various applications (e.g., to camera 1043 as picture/video metadata, and to applications that provide location-based services).

Examples of other applications 1036 that may be stored in memory 1002 include other word processing applications, other image editing applications, drawing applications, presentation applications, JAVA-enabled applications, encryption, digital rights management, voice recognition, and voice replication.

In conjunction with touch screen 1012, display controller 1056, optical sensor(s) 1064, optical sensor controller 1058, a contact module, a graphics module, and image management module 1044, camera module 1043 includes executable instructions to capture still images or video (including a video stream) and store them into memory 1002, modify characteristics of a still image or video, or delete a still image or video from memory 1002.

In conjunction with touch screen 1012, display controller 1056, a contact module, a graphics module, a text input module, and camera module 1043, image management module 1044 includes executable instructions to arrange, modify (e.g., edit), or otherwise manipulate, label, delete, present (e.g., in a digital slide show or album), and store still and/or video images.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1002 may store a subset of the modules and data structures identified above. Furthermore, memory 1002 may store additional modules and data structures not described above.

In some embodiments, device 1000 is a device where operation of a predefined set of functions on the device is performed exclusively through a touch screen and/or a touchpad. By using a touch screen and/or a touchpad as the primary input control device for operation of device 1000, the number of physical input control devices (such as push buttons, dials, and the like) on device 1000 may be reduced.

The predefined set of functions that may be performed exclusively through a touch screen and/or a touchpad include navigation between user interfaces. In some embodiments, the touchpad, when touched by the user, navigates device 1000 to a main, home, or root menu from any user interface that may be displayed on device 1000. In such embodiments, the touchpad may be referred to as a "menu button." In some other embodiments, the menu button may be a physical push button or other physical input control device instead of a touchpad.

In different embodiments, device 1000 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera. Example embodiments of device 1000 are illustrated in FIGS. 11 and 12, which are discussed below.

FIG. 11 is a logical block diagram illustrating an example portable multifunction device, according to some embodiments. FIG. 11 illustrates a portable multifunction device 1000 having a touch screen 1012 in accordance with some embodiments. The touch screen may display one or more graphics within user interface (UI). In this embodiment, as well as others described below, a user may select one or more of the graphics by making a gesture on the graphics, for example, with one or more fingers or one or more styluses.

Device 1000 may also include one or more physical buttons, such as "home" or menu button 1104. As described previously, menu button 1104 may be used to navigate to any application 1036 in a set of applications that may be executed on device 1000. Alternatively, in some embodiments, the menu button is implemented as a soft key in a GUI displayed on touch screen 1012.

In one embodiment, device 1000 includes touch screen 1012, menu button 1104, push button(s) for powering the device on/off and locking the device, volume adjustment button(s), a Subscriber Identity Module (SIM) card slot, a head set jack, and docking/charging external port 1024. Push button(s) may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1000 also may accept verbal input for activation or deactivation of some functions through a microphone.

It should be noted that, although many of the following examples will be given with reference to optical sensor/camera 1064 (on the front of a device), rear-facing camera or optical sensor that is pointed opposite from the display may be used instead of optical sensor/camera 1064.

FIG. 12 is a logical block diagram illustrating computer system 1200 that is configured to execute any or all of the embodiments described above. For example, computer system 1200 may be configured similarly to portable multifunction device 1000 of FIGS. 10 and 11. In different embodiments, computer system 1200 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera module as described herein, may be executed in one or more computer systems 1200, which may interact with various other devices. Note that any component, action, or functionality described above with respect to FIGS. 1-11 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as a cursor control device, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. In some embodiments, processors 1210 may be configured to send control signals to a solid state lens in a camera module, where the camera module is connected to processors 1210 by a flexible circuit board configured to communicate via I/O interface 1230. In various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of CPU(s) 1210 may commonly, but not necessarily, implement the same ISA. Processors 1210 may employ any microarchitecture, including scalar, superscalar, pipelined, superpipelined, out of order, in order, speculative, non-speculative, etc., or combinations thereof. Processors 1210 may include circuitry to implement microcoding techniques. Processors 1210 may include one or more processing cores each configured to execute instructions. Processors 1210 may include one or more levels of caches, which may employ any size and any configuration (set associative, direct mapped, etc.).

System memory 1220 may be configured to store camera control program instructions 1225 and/or camera control data accessible by processor 1210. In various embodiments, system memory 1220 may be implemented using any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 1200 in a chip-on-chip configuration, a package-on-package configuration, or a multi-chip module configuration. In some embodiments, system memory 1220 may store pixel data or other image data or statistics in various formats. Similarly, while the example system 1200 illustrated in FIG. 12 may include persistent storage for non-volatile storage of image data or other data used in the system, in other embodiments, the system may include other types of non-volatile memory (e.g. read-only memory (ROM)) for those purposes. In an embodiment, system memory 1220 may include data, such as a camera control program instructions 1225. In the illustrated embodiment, program instructions 1225 may be configured to implement a lens control application (e.g., camera control program instructions 1225) incorporating any of the functionality described above. Additionally, existing camera control data of memory 1220 may include any of the information or data structures described above. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor(s) 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions (e.g., camera control program instructions 1225), which may be processor-executable to implement any element or action described above. In one embodiment, the program instructions may implement the methods described above. In other embodiments, different elements and data may be included. Note that data may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Those skilled in the art will appreciate that system 1200 is merely illustrative and is not intended to limit the scope of embodiments. For example, system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 1220 may be executed by processor(s) 1210 to provide various functions of system 1200.

In other embodiments, various functions may be performed by software components executing in memory on another device and communicating with the illustrated system via inter-computer communication. Some or all of these software components or any data structures described herein may be stored (e.g., as instructions or structured data) in system memory 1220, in persistent storage, or may be stored on a non-transitory computer-readable medium or a portable article to be read by an appropriate drive. In some embodiments, instructions stored on a computer-accessible medium separate from system 1200 may be transmitted to system 1200 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

As described above, the internal location of the electrical interconnects improves the reliability of the camera module by protecting the electrical interconnects from scratches and other physical damage. Similarly, the vertical extension of the lens barrel or the lens barrel holder may physically protect the solid state lens by guarding the edge of the lens from scratches or pressure due to contact with external objects. Since the solid state lens is configured to flex in response to electrical signals to change a focus of the camera module and/or adjust one or more attributes of an image received by the camera module, the solid state lens does not require actuator motor components. The camera module may thus occupy a relatively smaller amount of space in the Z-direction (i.e., a reduced Z-axis profile). Therefore, a camera module may as described above and illustrated in the Figures may include a solid state lens and multiple protected electrically conductive interconnects that enable the camera module to selectively focus on objects at different distances without the need for bulky actuators or other moving components.

What is claimed is:

1. A camera module, comprising:
   a solid state lens configured to flex, in response to one or more electrical signals;
   a lens barrel configured to hold the solid state lens;
   an image sensor below the lens barrel;
   a lens barrel holder configured to hold the lens barrel above the image sensor, wherein the lens barrel holder comprises:
      two or more electrically conductive interconnects configured to transmit the one or more electrical signals between a bottom end of the lens barrel holder and a top end of the lens barrel holder in proximity to the solid state lens, wherein the conductive interconnect is not exposed to an exterior of the lens barrel holder;
      two or more lower electrically conductive connections in proximity to respective bottom ends of the conductive interconnects and connecting the electrically conductive interconnects to respective conductors for the one or more electrical signals; and
      two or more upper electrically conductive connections configured to electrically connect the solid state lens to respective ones of the two or more conductive interconnects.

2. The camera module of claim 1, wherein the two or more conductive interconnects comprise electrically conductive material on an inside surface of the lens barrel holder.

3. The camera module of claim 1, wherein the two or more conductive interconnects comprise electrically conductive material inside a wall of the lens barrel holder, and wherein the two or more conductive interconnects are not exposed to an inner surface or an outer surface of the lens barrel holder.

4. The camera module of claim 1, wherein the upper electrically conductive connections comprise electrically conductive material in holes, cavities, or depressions of the lens barrel holder.

5. The camera module of claim 1, wherein the lower electrically conductive connections and the upper electrically conductive connections comprise electrically conductive solder.

6. The camera module of claim 1, wherein the lower electrically conductive connections and the upper electrically conductive connections comprise electrically conductive adhesive.

7. The camera module of claim 1, further comprising a protective ring positioned around an outer edge of the solid state lens, wherein the protective ring is part of the lens barrel or part of the lens barrel holder.

8. A multifunction device, comprising:
   a central processing unit;
   a system memory connected to the central processing unit; and
   a camera module connected to the central processing unit, wherein the camera module comprises:
      a solid state lens configured to flex, in response to one or more electrical signals;
      a lens barrel configured to hold the solid state lens;
      an image sensor below the lens barrel;
      a lens barrel holder configured to hold the lens barrel above the image sensor, wherein the lens barrel holder comprises:
         two or more electrically conductive interconnects configured to transmit respective ones of the one or more electrical signals between a bottom end of the lens barrel holder and a top end of the lens barrel holder in proximity to the solid state lens, wherein the conductive interconnect is not exposed to an exterior of the lens barrel holder;

two or more lower electrically conductive connections in proximity to respective ones of the conductive interconnects and connecting the electrically conductive interconnects to respective conductors for the one or more electrical signals; and two or more upper electrically conductive connections configured to electrically connect the solid state lens to respective ones of the two or more conductive interconnects.

9. The multifunction device of claim 8, wherein the two or more conductive interconnects comprise electrically conductive material on an inside surface of the lens barrel holder.

10. The multifunction device of claim 8, wherein the two or more conductive interconnects comprise electrically conductive material in inside a wall of the lens barrel holder, and wherein the two or more conductive interconnects are not exposed to an inner surface or an outer surface of the lens barrel holder.

11. The multifunction device of claim 8, wherein the upper electrically conductive connections comprise electrically conductive material in holes, cavities, or depressions in the lens barrel holder.

12. The multifunction device of claim 8, wherein the lower electrically conductive connections and the upper electrically conductive connections comprise electrically conductive solder.

13. The multifunction device of claim 8, wherein the lower electrically conductive connections and the upper electrically conductive connections comprise electrically conductive adhesive.

14. The multifunction device of claim 8, wherein the camera module further comprises a substrate below the lens barrel, and wherein:

the substrate comprises a hole in the center of the substrate along the optical axis; and the image sensor is flip chip mounted to an underside of the substrate.

15. A method of manufacturing a camera module, comprising:

forming a lens barrel configured to hold a solid state lens;

forming a lens barrel holder configured to hold the lens barrel above an image sensor;

forming, in the lens barrel holder, two or more electrically conductive interconnects configured to transmit one or more electrical signals between a bottom end of the lens barrel holder and a top end of the lens barrel holder, wherein the conductive interconnect is not exposed to an exterior of the lens barrel holder;

positioning respective ones of two or more lower electrically conductive connections in proximity to respective ones of the two or more conductive interconnects;

positioning respective ones of two or more upper electrically conductive connections in proximity to respective ones of the two or more conductive interconnects, wherein the two or more upper electrically conductive connections are configured to electrically connect a solid state lens to respective ones of the two or more conductive interconnects; and positioning, at a top end of the lens barrel, the solid state lens.

16. The method of claim 15, wherein forming the two or more conductive interconnects in the lens barrel holder further comprises adding electrically conductive material to the lens barrel holder with a laser direct structuring (LDS) process.

17. The method of claim 15, wherein forming the two or more conductive interconnects in the lens barrel holder further comprises mechanically inserting electrically conductive material into two or more respective holes in the lens barrel holder.

18. The method of claim 15, wherein forming the lens barrel holder further comprises:

inserting the two or more conductive interconnects into a mold of the lens barrel holder; and injecting plastic into the mold around the two or more conductive interconnects.

19. The method of claim 15, wherein the lower conductive connections and the upper conductive connections comprise electrically conductive solder.

20. The method of claim 15, wherein the lower conductive connections and the upper conductive connections comprise conductive electrically adhesive.

* * * * *